(12) United States Patent
Maas et al.

(10) Patent No.: US 11,687,833 B2
(45) Date of Patent: Jun. 27, 2023

(54) DATA MANAGEMENT FORECASTING FROM DISTRIBUTED TRACING

(71) Applicant: Google LLC, Mountain View, CA (US)

(72) Inventors: Martin Christoph Maas, Mountain View, CA (US); Giulio Zhou, San Ramon, CA (US)

(73) Assignee: GOOGLE LLC, Mountain View, CA (US)

(*) Notice: Subject to any disclaimer, the term of this patent is extended or adjusted under 35 U.S.C. 154(b) by 263 days.

(21) Appl. No.: 17/004,939

(22) Filed: Aug. 27, 2020

(65) Prior Publication Data

US 2022/0067569 A1 Mar. 3, 2022

(51) Int. Cl.
*G06N 20/00* (2019.01)
*G06F 16/28* (2019.01)

(52) U.S. Cl.
CPC ........... *G06N 20/00* (2019.01); *G06F 16/285* (2019.01)

(58) Field of Classification Search
CPC .............................. G06N 20/00; G06F 16/285
See application file for complete search history.

(56) References Cited

U.S. PATENT DOCUMENTS

| | | | |
|---|---|---|---|
| 8,010,337 B2 | 8/2011 | Narayanan et al. | |
| 8,560,618 B2 * | 10/2013 | Pacheco-Sanchez | ........................ H04L 41/147 705/7.29 |
| 9,658,941 B2 | 5/2017 | Voccio et al. | |
| 9,916,232 B2 | 3/2018 | Voccio et al. | |
| 11,327,970 B1 * | 5/2022 | Li | ..................... G06F 16/24549 |
| 2021/0303638 A1 * | 9/2021 | Zhong | ................. G06F 18/2148 |

FOREIGN PATENT DOCUMENTS

CN 105224445 B 2/2017

OTHER PUBLICATIONS

Choi, Elsevier, 2019, pp. 413-426.*
Hernández-Orallo, Elsevier, 2009, pp. 2727-2739.*
Kant, IEEE, 1999, pp. 731-747.*
Yu, Elsevier, 2019, pp. 1-14.*

(Continued)

*Primary Examiner* — Michael I Ezewoko
(74) *Attorney, Agent, or Firm* — Dority & Manning, P.A.

(57) ABSTRACT

A computer-implemented method for using machine learning to handle data in a computing system with improved efficiency can include obtaining a handling request associated with a data item, the handling request instructing the computing system to perform a handling operation with the data item, obtaining a trace log comprising one or more distributed trace items, the one or more distributed trace items including data from each of one or more services interacting with the data item, providing the trace log to a data characteristic prediction model including one or more machine-learned models, receiving, in response to providing the trace log to the data characteristic prediction model, one or more data characteristic predictions associated with the data item, and selecting a handling operation of a plurality of candidate handling operations based at least in part on the one or more data characteristic predictions.

20 Claims, 8 Drawing Sheets

(56) References Cited

OTHER PUBLICATIONS

Abadi et al., "TensorFlow: A System for Large-Scale Machine Learning", 12th Usenix Symposium on Operating Systems Design and Implementation (OSDI '16), Nov. 2-4, 2016, Savannah, GA, 21 pages.
Barham et al., "Magpie: Online Modelling and Performance-aware Systems", 9th Workshop on Hot Topics in Operating Systems, May 18-21, 2003, Lihue (Kauai), Hawaii, 6 pages.
Beckmann et al., "LHD: Improving Cache Hit Rate by Maximizing Hit Density", 15th USENIX Symposium on Networked Systems Design and Implementation, Apr. 9-11, 2018, Renton, WA, 16 pages.
Beckmann et al., "Maximizing Cache Performance Under Uncertainty", IEEE Symposium on High Performance Computer Architecture (HPCA 2017), Feb. 4-8, 2017, Austin, TX, 12 pages.
Bishop, "Mixture Density Networks", Aston University, Feb. 1994, 26 pages.
Carlson, "Redis In Action", Manning, Shelter Island, NY, 2013, 322 pages.
Chang et al., "Automatic I/O Hint Generation Through Speculative Execution", 3rd Symposium on Operating Systems Design and Implementation, Feb. 22-25, 1999, New Orleans, LA, 15 pages.
CHANG et al., "Bigtable: A Distributed Storage System for Structured Data", ACM Transactions on Computer Systems (TOCS), vol. 26, No. 2, Article 4, Jun. 2008, 26 pages.
Chang et al., "Profile-guided Automatic Inline Expansion for C Programs", Software: Practice and Experience, vol. 22, No. 5, May 1992, pp. 349-369.
Corbett et al., "Spanner: Google's Globally-Distributed Database", ACM Transactions on Computer Systems, vol. 31, No. 3, Aug. 2013, 22 pages.
Cortez et al., "Resource Central: Understanding and Predicting Workloads for Improved Resource Management in Large Cloud Platforms", Twenty-sixth Symposium on Operating Systems Principles (SOSP '17), Oct. 27, 2017, Shanghai, China, 15 pages.
Delimitrou et al., "Quasar: Resource-Efficient and QoS-Aware Cluster Management", Nineteenth International Conference on Architectural Support for Programming Languages and Operating Systems (ASPLOS 2014), Mar. 1-5, 2014, Salt Lake City, Utah, 17 pages.
Devlin et al., "BERT: Pre-training of Deep Bidirectional Transformers for Language Understanding", arXiv:1810.04805v1, Oct. 11, 2018, 14 pages.
Ding et al., "DiskSeen: Exploiting Disk Layout and Access History to Enhance I/O Prefetch", 2007 USENIX Annual Technical Conference, Jun. 17-22, 2007, Santa Clara, CA, pp. 261-274.
Fernandez et al., "Gaussian Processes for Survival Analysis", arXiv:1611.00817v1, Nov. 2, 2016, 13 pages.
Fisher et al., "Predicting Conditional Branch Directions from Previous Runs of a Program", Fifth International Conference on Architectural Support for Programming Languages and Operating Systems, Oct. 12-15, 1992, Boston Massachusetts, 11 pages.
Fitzpatrick, "Distributed Caching with Memcached", Linux Journal, vol. 124, Aug. 2004, 6 pages.
Gan et al., "An Open-Source Benchmark Suite for Microservices and Their Hardware-Software Implications for Cloud & Edge Systems", 24th ACM International Conference on Architectural Support for Programming Languages and Operating Systems (ASPLOS 2019), Apr. 13-17, 2019, Providence, RI, 16 pages.
Gan et al., "Seer: Leveraging Big Data to Navigate the Complexity of Performance Debugging in Cloud Microservices", 24th ACM International Conference on Architectural Support for Programming Languages and Operating Systems (ASPLOS 2019), Apr. 13-17, 2019, Providence, RI, 15 pages.
Ghemawat et al., "The Google File System", 19th ACM Symposium on Operating Systems Principles, Oct. 19-22, 2003, Bolton Landing, New York, 15 pages.
Guerra et al., "Cost Effective Storage using Extent Based Dynamic Tiering", 9th USENIX Conference on File and Storage Technologies, Feb. 15-17, 2011, San Jose, CA, 14 pages.
Han et al., "Deep Compression: Compressing Deep Neural Networks With Pruning, Trained Quantization And Huffman Coding", arXiv:1510.00149v3, Nov. 20, 2015, 13 pages.
Hashemi et al., "Learning Memory Access Patterns", International Conference on Machine Learning, Jul. 10-15, 2018, Stockholm, Sweden, 10 pages.
Hinton et al., "Distilling the Knowledge in a Neural Network", arXiv:1503.02531v1, Mar. 9, 2015, 9 pages.
Horchreiter et al., "Long Short-Term Memory", Neural Computation, vol. 9, No. 8, 1997, 32 pages.
Howard et al., "Scale and Performance in a Distributed File System", ACM Transactions on Computer Systems, vol. 6, No. 1, Feb. 1988, pp. 51-81.
Jaleel et al., "High Performance Cache Replacement Using Re-Reference Interval Prediction (RRIP)", ACM IEEE International Symposium on Computer Architecture (ISCA), Jun. 19-23, 2010, Saint-Malo, France, 12 pages.
Jimenez et al., "Dynamic Branch Prediction with Perceptrons", Proceedings HPCA Seventh International Symposium on High-Performance Computer Architecture, 2001, pp. 197-206.
Jouppi et al., "In-Datacenter Performance Analysis of a Tensor Processing Unit", ICSA 2017: IEEE International Conference on Software Architecture, Apr. 4-7, 2017, Gothenburg, Sweden, 12 pages.
Jozefowicz et al., "Exploring the Limits of Language Modeling", arXiv:1602.02410v2, Feb. 11, 2016, 11 pages.
Kanev et al., "Profiling a warehouse-scale computer", International Symposium on Computer Architecture (ISCA), Jun. 13-17, 2015, Portland, Oregon, 12 pages.
Karampatsis et al., "Maybe Deep Neural Networks are the Best Choice for Modeling Source Code", arXiv:1903.05734v1, Mar. 13, 2019, 12 pages.
Kim et al., Interpretability Beyond Feature Attribution: Quantitative Testing with Concept Activation Vectors (TCAV), Thirty-fifth International Conference on Machine Learning, Jul. 10-15, 2018, Stockholm, Sweden, 10 pages.
Kim et al., "PCStream: Automatic Stream Allocation Using Program Contexts", 10th USENIX Workshop on Hot Topics in Storage and File Systems (Hot Storage 18), Jul. 9-10, 2018, Boston, MA, 6 pages.
Kirilin et al., "RL-Cache: Learning-Based Cache Admission for Content Delivery", ACM SIGCOMM 2019 Workshop on Network Meets AI & ML (NetAI 2019), Aug. 19-24, 2019, Beijing, China, 14 pages.
Klimovic et al., "Flash Storage Disaggregation", Eleventh European Conference on Computer Systems, Apr. 18-21, 2016, London, UK, 15 pages.
Kneser et al., "Improved Backing-Off for M-Gram Language Modeling", 1995 International Conference on Acoustics, Speech and Signal Processing, vol. 1, 1995, pp. 181-184.
Kraska et al., "The Case for Learned Index Structures", The Case for Learned Index Structures, ACM SIGMOD/PODS International Conference on Management of Date, Jun. 10-15, 2018, Houston, Texas, pp. 489-504.
Lee et al., "Set Transformer: A Framework for Attention-based Permutation-Invariant Neural Networks", 36th International Conference on Machine Learning, Jun. 9-15, 2015, Long Beach, CA, 10 pages.
Maas et al., "Learning-based Memory Allocation for C++ Server Workloads", 25th ACM International Conference on Architectural Support for Programming Languages and Operating Systems (ASPLOS), Mar. 16-20, 2020, Lausanne, Switzerland, 16 pages.
Mesnier et al., "File Classification in Self-* storage systems", International Conference on Autonomic Computing, May 17-19, 2004, New York, NY, 14 pages.
Mikolov et al., "Efficient Estimation of Word Representations in Vector Space", arXiv:1301.3781v3, Sep. 7, 2013, 12 pages.
Mullen, "The Lognormal Distribution of Software Failure Rates: Application to Software Reliability Growth Modeling", Ninth Inter-

(56) References Cited

OTHER PUBLICATIONS national Symposium on Software Reliability Engineering (ISSRE), Nov. 4-7, 1998, Paderborn, Germany, 9 pages.

Nightingale et al., "Speculative Execution in a Distributed File System", 20th ACM Symposium on Operating Systems Principles, Oct. 23-26, 2005, Brighton, UK, 15 pages.

OpenCensus, "OpenCensus", https://opencensus.io/, retrieved on Apr. 19, 2021, 4 pages.

Ousterhout et al., "The RAMCloud Storage System" ACM Transactions on Computer Systems, vol. 33, No. 3, Aug. 2015, pp. 7:1-7:55.

Park, et al., "3 Sigma: distribution-based cluster scheduling for runtime uncertainty", Thirteenth EuroSys Conference, Apr. 23-26, 2018, Porto, Portugal, 21 pages.

Patterson, "Informed Prefetching and Caching", Carnegie Mellon University, Technical Report, 1997, 259 pages.

Przybylski, "The Performance Impact of Block and Fetch Strategies", 1990 The 17th Annual International Symposium on Computer Architecture, May 28-31, 1990, Seattle, WA, pp. 160-169.

Radford et al., "Language Models are Unsupervised Multitask Learners", Open AI Blog, Technical Report, 2019, 24 pages.

Safavian et al., "A Survey of Decision Tree Classifier Methodology", IEEE Transactions on Systems, Man, and Cybernetics, vol. 21, No. 3, May 1991, 58 pages.

Serenyi, "Cluster-Level Storage @ Google How we use Colossus to improve storage efficiency", PDSW-DISCS 2017: 2nd Joint International Workshop on Parallel Data Storage and Data Intensive Scalable Computing Systems, Nov. 13, 2017, Denver, CO, 29 pages.

Shin et al., "Providing QoS through Host Controlled Flash SSD Garbage Collection and Multiple SSDs", 2015 International Conference on Big Data and Smart Computing (BigComp), Feb. 9-11, 2015, Jeju, South Korea, pp. 111-117.

Shrivastava et al., "On-the-Fly Adaptation of Source Code Models using Meta-Learing", arXiv:2003.11768v1, Mar. 26, 2020, 12 pages.

Shvachko et al., "The Hadoop Distributed File System", MSST, vol. 10, 2010, pp. 1-10.

Sigelman et al., "Dapper, a Large-Scale Distributed Systems Tracing Infrastructure", Google, Inc., Google Technical Report, Apr. 2010, 14 pages.

Smith, "Cache Memories", ACM Computing Surveys, vol. 14, No. 3, Sep. 1982, pp. 473-530.

Song et al., "Learning Relaxed Belady for Content Distribution Network Caching", 17th USENIX Symposium on Networked Systems Design and Implementation (NSDI 20), Feb. 25-27, 2020, Santa Clara, CA, 17 pages.

Stonebraker et al., "The Postgres Next-Generation Database Management System", Communications of the ACM, vol. 34, No. 10, Oct. 1991, pp. 78-92.

Sun et al., "Does Hard Disk Drive Failure Rate Enter Steady-State After One Year?", Annual Reliability and Maintainability Symposium, Jan. 22-25, 2007, Orlando Florida, pp. 356-361.

Thereska et al., "Stardust: Tracking Activity in a Distributed Storage System", ACM SIGMETRICS Performance Evaluation Review, vol. 34, No. 1, Jun. 2006, 12 pages.

Vanderwiel et al., "Data Prefetch Mechanisms", ACM Computing Surveys, vol. 32, No. 2, Jun. 2000, 25 pages.

Vaswani et al., "Attention Is All You Need", Thirty-first Conference on Neural Information Processing Systems, Dec. 4-9, 2017, Long Beach, CA, 11 pages.

Vaswani et al., "Tensor2Tensor for Neural Machine Translation", arXiv:1803.07416v1, Mar. 16, 2018, 9 pages.

Weil, et al., "Ceph: A Scalable, High-Performance Distributed File System", OSDI '06 7th USENIX Svmposium on Operating Systems Design and Implementation, Nov. 6-8, 2006, Seattle, WA, 14 pages.

Yang et al., "XLNet: Generalized Autoregressive Pretraining for Language Understanding", Thirty-third Conference on Neural Information Processing Systems, Dec. 8-14, 2019, Vancouver, Canada, 11 pages.

\* cited by examiner

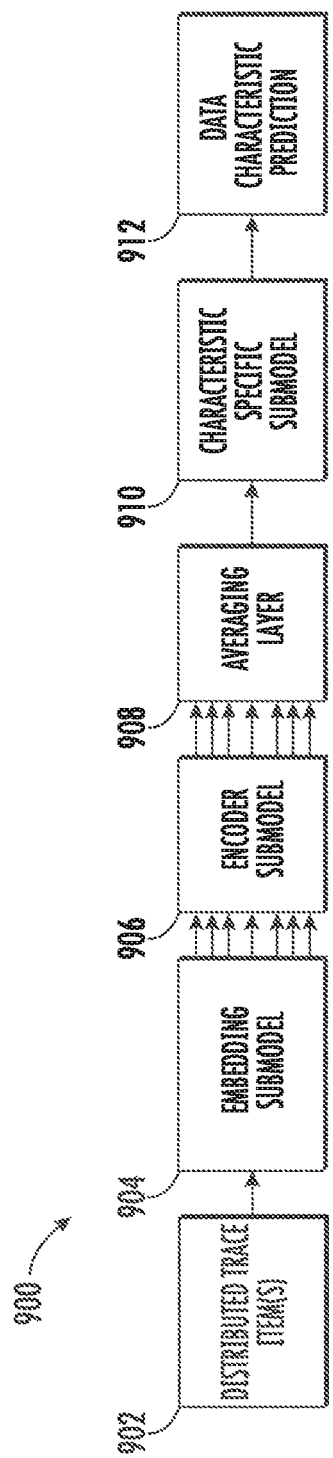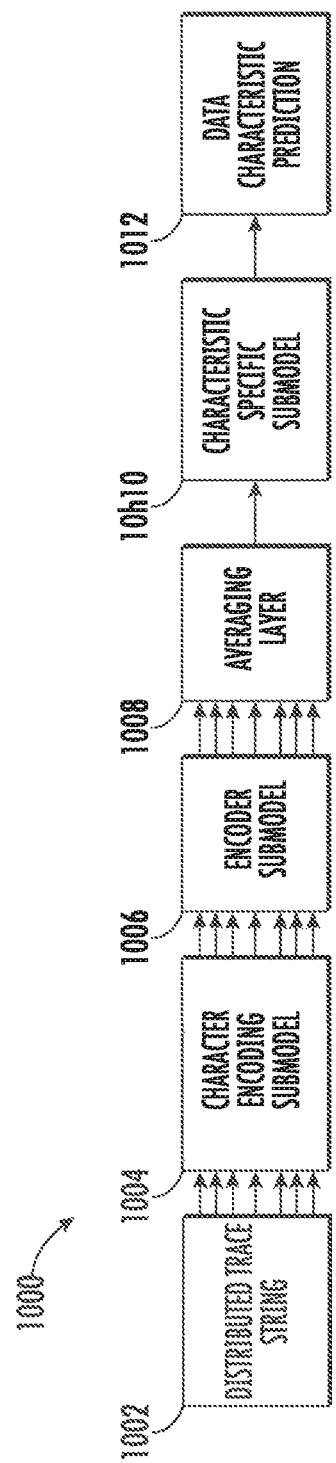

DATA MANAGEMENT FORECASTING FROM DISTRIBUTED TRACING

FIELD

The present disclosure relates generally to predicting data handling predictions from distributed tracing data. More particularly, the present disclosure relates to handling of data, such as in a database, data center, etc., by employing predictive multi-task modeling based on data from a distributed tracing protocol.

BACKGROUND

Data handling systems are required to make data handling decisions regarding treatment (e.g., handling) of data. For instance, a data center can process information across multiple computers and/or services running on the computers. The data handling decisions are typically based on expected attributes of the data, such as expected accesses of the data, time period for which the data will remain relevant, file size, etc. Ideally, the data center will make data handling decisions that provide improved performance on the data center, and limit computationally intense actions such as data retrieval from a permanent handling medium. It is often necessary to make predictions related to the expected attributes to make informed data handling decisions, as the expected attributes may typically relate to future accesses and other events that do not have a guaranteed occurrence and outcome.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for using machine learning to handle data in a computing system with improved efficiency. The computer-implemented method can include obtaining, by a computing system comprising one or more computing devices, a handling request associated with a data item, the handling request instructing the computing system to perform a handling operation with the data item. The computer-implemented method can include obtaining, by the computing system, a trace log comprising one or more distributed trace items, the one or more distributed trace items including data from each of one or more services interacting with the data item. The computer-implemented method can include providing, by the computing system, the trace log to a data characteristic prediction model including one or more machine-learned models. The computer-implemented method can include, in response to providing the trace log to the data characteristic prediction model, receiving, by the computing system, one or more data characteristic predictions associated with the data item. The computer-implemented method can include selecting, by the computing system, a handling operation of a plurality of candidate handling operations based at least in part on the one or more data characteristic predictions.

Another example aspect of the present disclosure is directed to a computing system configured for using machine learning to handle data with improved efficiency. The computing system can include one or more processors and one or more memory devices, the one or more memory devices storing a data characteristic prediction model comprising one or more machine-learned models and computer-readable instructions that, when implemented, cause the one or more processors to perform operations. The operations can include obtaining a handling request associated with a data item, the handling request instructing the computing system to perform a handling operation with the data item. The operations can include obtaining a trace log comprising one or more distributed trace items, the one or more distributed trace items including data from each of one or more services interacting with the data item. The operations can include providing the trace log to a data characteristic prediction model including one or more machine-learned models. The operations can include, in response to providing the trace log to the data characteristic prediction model, receiving one or more data characteristic predictions associated with the data item. The operations can include selecting a handling operation of a plurality of candidate handling operations based at least in part on the one or more data characteristic predictions.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 9 depicts a block diagram of an example data characteristic prediction model according to example embodiments of the present disclosure.

FIG. 10 depicts a block diagram of an example data characteristic prediction model according to example embodiments of the present disclosure.

Figure 1:
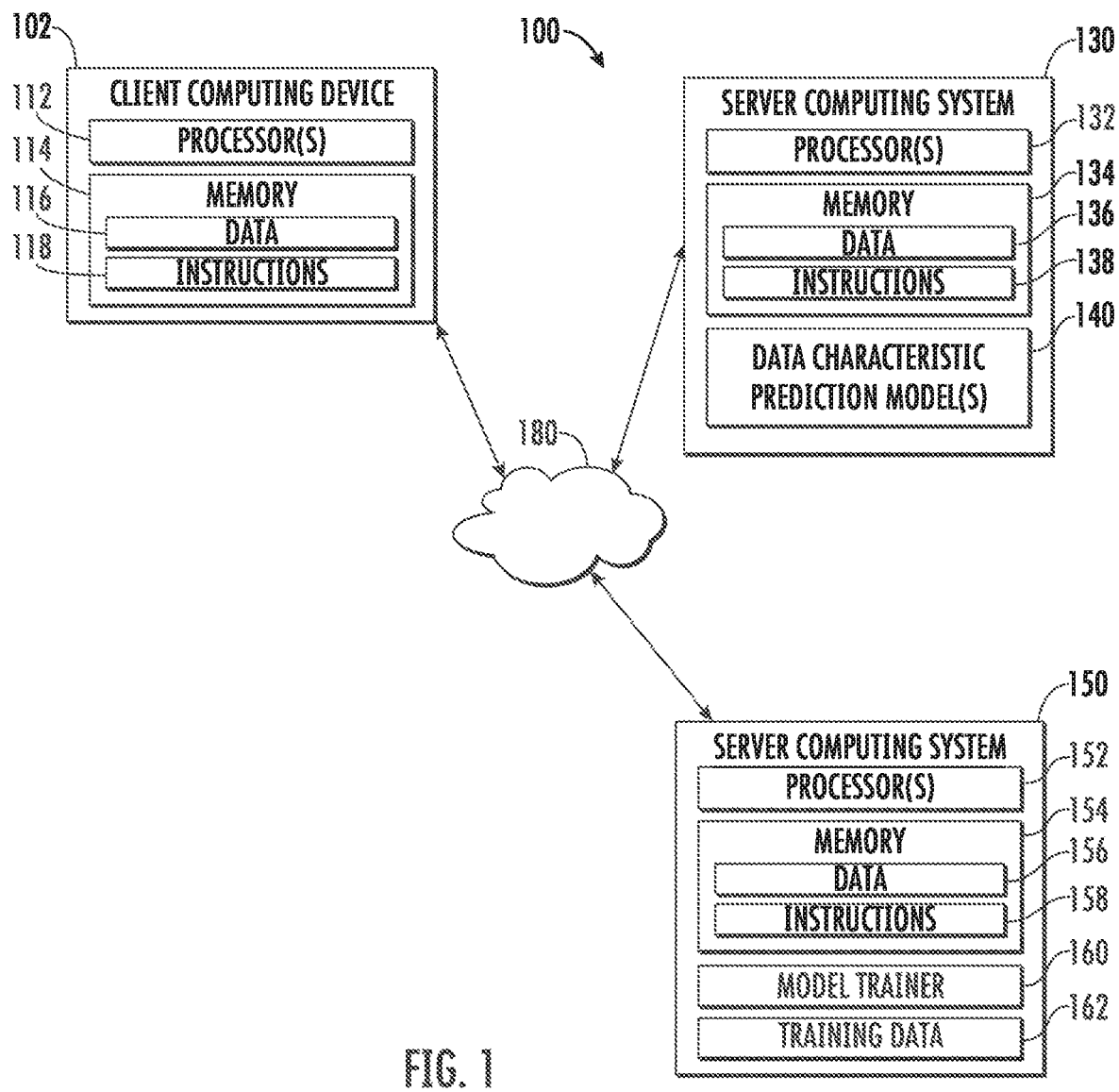
FIG. 1 depicts a block diagram of an example computing system that performs data characteristic predicting according to example embodiments of the present disclosure.

Reference numerals that are repeated across plural figures are intended to identify the same features in various implementations.

DETAILED DESCRIPTION

Generally, the present disclosure is directed to data handling predicting from distributed tracing. According to example aspects of the present disclosure, a computing system (e.g., a data center) can encounter a handling event (e.g., an allocation request, a storage request, etc.) in which it is necessary for the computing system to make a decision with regard to data handling, such as choosing a handling option of a plurality of handling options to store, transfer, and/or otherwise handle a data item. For a particular data item, a computing system can include or access a trace log (e.g., a distributed trace string) that includes one or more distributed trace item(s) that represent a compute path of the data item prior to the handling event, such as a compute path through a plurality of services operating on the computing system. For example, the trace log can be produced by a distributed tracing protocol for debugging, resource usage tracking, etc., of the computing system. The trace log and/or the distributed trace item(s) can be provided to a data characteristic prediction model (e.g., a machine-learned data characteristic prediction model) that can predict, based at least in part on the trace log, one or more data characteristic predictions(s). For instance, the data characteristic may be a multi-task data characteristic model that can be configured to produce data characteristic predictions for multiple types of data characteristics in response to a same input. The data characteristic predictions can include expected characteristics of the data item that can be useful in making handling decisions, such as interarrival access time, file lifetime, read/write fraction, file size, or other suitable characteristics for which the model is configured. For instance, the data characteristics can be provided to a handling decision model (e.g., a heuristic model, machine-learned model, etc.) that determines a handling decision based on the predicted data characteristics, such as in cases where the data characteristic does not directly include the handling decision. Thus, the computing system can achieve improved performance by leveraging rich categorical information available in the complex, relatively unstructured trace logs provided by distributed tracing protocols in making data handling decisions.

A computing system, such as a handling service in a data center, may continuously be required to resolve data handling decisions between a plurality of different handling tasks and/or options, such as for cache admission, prefetching, and block allocation, and/or other suitable handling tasks. For instance, a data center can contain a plurality of different storage systems and services, such as distributed file systems, in-memory caching services and databases. The storage systems and/or services can operate behind an RPC (remote procedure call) abstraction and can be accessed by workloads that are composed of interconnected services communicating through RPCs. For example, services may be associated with one or more client devices, applications, etc. and may communicate with other services, such as by message passing.

Handling decisions can be typically driven by heuristics based on statistical workload properties such as temporal locality or common file sizes. In some cases, each handling option can produce a different effect on performance of the computing system. For example, handling options can each have different trade-offs and optimize for different metrics. As one example, a caching service can keep objects in low-latency storage media and may prioritize access latency, which may be beneficial for objects that are frequently accessed. As another example, a file system might prioritize overall disk footprint (e.g., file size) while providing improved robustness and/or durability guarantees. Thus, handling services (e.g., storage services) can desirably make decisions that fit a data item to a handling option that is appropriate for providing good performance, based on data characteristics about the data item. As one example, a cache service may maximize hit rate by caching objects based on their future access. As another example, block allocators may reduce fragmentation by co-locating allocations of comparable lifetime.

Computing systems can rely on heuristics for these handling decisions, such as LRU replacement policies or best-fit allocation. These heuristics can utilize statistical workload properties like temporal or spatial locality. However, due to, for example, complexity of the system and/or other considerations, the heuristics can be unable to leverage application-level signals, such as whether or not a request belongs to a temporary file or is intended for long-term storage. The quality of decisions can be improved through application-level information, such as a database operation that a handling request (e.g., a storage request) originates from. While it can be possible to communicate such high-level information to the storage system as hints (e.g., using prefetch commands or non-temporal stores), manually assigning these hints is brittle, work-intensive and/or incurs technical debt. For instance, although such features can be exploited through application hints (e.g., explicit prefetches), providing such application hints directly can require manual work to program and may be infeasible for some computing systems (e.g., large data centers). For instance, some datacenters may use explicit application hints for a particular file being accessed, such as application hints specifying readahead, etc. However, the application hints, if utilized, can be costly to configure and program. In addition, the application hints can easily become deprecated or otherwise inaccurate due to changes in the computing system (e.g., updated services), which can provide for insufficient robustness of the hints.

Thus, explicit information about these data characteristics is typically unavailable. To solve this, a computing system can make predictions (e.g., predicting) of the data characteristics. For instance, to resolve handling decisions, a computing system may need to make predictions about future workload, system behavior, etc. These predictions can frequently depend on the application-level information that is conventionally unavailable explicitly in the computing system. For instance, data characteristics of a data item (e.g., file size, lifetime, access time and/or frequency, etc.) can frequently depend on services and/or applications from which the data item originates. While the application-level information may be explicitly unavailable in a computing system, it may be implicitly available in trace logs generated in accordance with a distributed tracing protocol that tracks a compute path of a data item through the computing system. Systems and methods of the present disclosure can provide for a computing system to leverage these trace logs to provide improved predictions of data characteristics without requiring explicitly providing application-level information throughout the computing system (e.g., to a handling service, such as a storage service).

For example, a computing system may include two databases, database A and database B having two different configurations, configuration A and configuration B. The configurations may be listed in a configuration string attached to each storage request. Configuration A may include a first garbage collection interval (e.g., 5 minutes) and/or configuration B may include a second garbage collection interval (e.g., 5 hours). A storage system, such as a caching service, may desirably leverage this information by caching requests from the service with configuration A but not configuration B, due to the relatively shorter garbage collection interval. However, this information may not be readily available to the computing system. For instance, to leverage this information, it may be necessary to provide information to the storage system describing that entries accessed by one type of request are re-used within a short interval and should thus be cached, while other entries are re-used at a longer interval. The storage system also needs to know that it needs to look at the configuration string and check for the presence of A or B in a particular location in order to distinguish between these two types of requests. While implementing such explicit data transfer is possible, changes in the system, such as if configuration A changes from 5 minutes to a longer duration of time, such as an hour, or if structure of the provided information changes, can break or otherwise reduce performance of these explicit rules.

According to example aspects of the present disclosure, a computing system can include one or more computing devices. The computing system can be a data center-scale computing system, such as a warehouse-scale computing system, that includes one or more memory devices. The computing system can include different types of memory devices, such as persistent memory, such as hard drives (e.g., spinning disks), solid state drives, etc., magnetic tape memory, and/or other types of persistent memory, and/or temporary memory (e.g., memory that loses value as a result of an interruption in power) such as, for example, random access memory, cached memory, key-value stores, etc. As another example, the computing system can include different tiers or levels of memory.

The computing system can include a plurality of services (e.g., instances of applications) that operate on the computing system (e.g., the computing devices) and that require computing resources such as memory access. For example, the services may each accomplish one or more tasks that contribute to an overall task of the computing system. The services can build upon one another and require a variety of different storage services, resulting in complex interactions within the system. In addition, computing systems such as warehouse-scale computers can have a long tail of applications with a diverse range of storage access behaviors. This complexity can present efficiency challenges associated with storage services.

The computing system can include a distributed tracing service. For instance, computing systems can run distributed tracing services based on distributed tracing frameworks that are designed to attribute resource usage, diagnose bugs in distributed systems, collect traces to be analyzed and replayed at a later point for debugging and/or analysis, etc. For example, some or all services that employ, operate on, or otherwise interact with a data item can append data including one or more distributed trace item(s) (e.g., a key and value pair) to a trace log (e.g., a distributed trace string) associated with the data item, which can accumulate information as the data item is continually processed. As examples, the distributed trace item(s) may be tags that indicate a particular category of request, such as a database operation, numerical information (e.g., an offset), medium and high cardinality labels that can contain unstructured data (e.g., project IDs, table names, etc.), high cardinality labels such as, for example, timestamps or transaction numbers, and/or any other suitable data. Data attached to trace logs by these systems (e.g., the distributed trace item(s)) captures a generally large amount of application-level context, such as the services that a data item was utilized by prior to a handling request.

One example distributed tracing framework is the Census distributed tracing framework, such as the open-source variant OpenCensus. Census enables profiling and resource accounting for distributed systems. Census provides a tagging API that allows services to generate key and value pairs (e.g., Census Tags), which are automatically propagated with all downstream requests and can be used to understand complex interactions. In the Census framework, when a storage request has reached a storage system, its accumulated Census tags encode rich context, including the compute path it took through the computing system.

In some cases, utilizing the trace logs (e.g., the distributed trace item(s) can present challenges. For instance, the trace logs may often be schema-less and/or unstructured. For example, the key and value pairs may be unpredictably assigned by a service, such as specified by a programmer of the service. For example, the key and value pairs may be allowed to contain any text string including any possible combination of characters, possibly subject to some restrictions such as string length, forbidden characters, etc. As another example, computing systems (e.g., data centers) may run a diverse and/or dynamic set of applications that contributes to a long tail of different application behaviors, which must be accounted for in utilizing the trace logs. Furthermore, the computing system may require no guarantees about certain service behaviors such that the services may frequently be changed and/or updated, causing the services to exhibit different behavior. Furthermore, models trained for a particular task may become stale over time, and may not transfer to new settings (e.g., a new storage system). Thus, a system utilizing the trace logs may beneficially be robust to changes in the system.

According to example aspects of the present disclosure, a computer-implemented method (e.g., implemented as operations by one or more processors) can provide for managing data in a computing system. For instance, the computer-implemented method can be stored as instructions in computer-readable memory. The computer-implemented method can be implemented by a computing system, such as a handling service running on the computing system that handles decisions about data handling.

The computer-implemented method can include obtaining (e.g., by a computing system including one or more computing devices) a handling request associated with a data item. The handling request can instruct the computing system to perform a handling operation with the data item. For instance, the handling request can instruct the computing system to select and/or execute a handling operation from a plurality of candidate handling operations. The handling operation can be related to handling the data item, such as storing the data item. For example, in some implementations, the handling operation (e.g., each of the candidate handling operations) can be associated with a unique storage medium of a plurality of storage mediums in the computing system. For example, the handling request can be a storage request, requiring that the computing system choose a storage medium in which to store the data item that accounts for future interactions with the data item (e.g., future reads, writes, eviction, etc.). For example, the plurality of storage mediums may include long-term storage, such as magnetic tape, hard disk drives (e.g., spinning disk drives), solid state drives, etc., and/or short-term storage, such as a cache.

The computer-implemented method can include obtaining, by the computing system, a trace log including one or more distributed trace items. The one or more distributed trace items can include data from each of one or more services that interact with the data item. For example, the trace log can be or can include a distributed trace string including a plurality of characters, where delineated subsets of characters represent each of the distributed trace items. In some implementations, the distributed trace item(s) can be or can include one or more key and value pairs.

The computer-implemented method can include providing (e.g., by the computing system) the trace log to a data characteristic prediction model. For instance, the data characteristic prediction model can be configured to produce one or more data characteristic predictions in response to receipt of the trace log. The data characteristic prediction model can include one or more machine-learned models (e.g., submodels). For instance, the one or more machine-learned models can be trained on training data that includes one or more distributed trace items from other computing systems and/or prior distributed trace items that are associated with prior handling requests.

For instance, a computing system can include a data characteristic prediction model, such as a machine-learned data characteristic prediction model that includes one or more machine-learned model(s) (e.g., submodel(s)). For instance, the data characteristic prediction model can be stored as computer-readable data on the one or more memory devices. As an example, the data characteristic prediction model can be employed by a handling service configured to handle data (e.g., storage requests) associated with the computing system. The computing system can include a handling service, such as a storage service. A handling service (e.g., storage service) can handle data transfer and/or storage for data item(s) (e.g., file(s), etc.) from the services. For example, the handling service can handle caching (e.g., cache policies, data eviction, etc.), data placement decisions (e.g., storage mediums), garbage collection, predictive prefetching, and/or other suitable handling tasks. The handling service can operate at any of different levels of a storage stack, such as managing physical storage (e.g., storage daemons in file servers, such as Ceph or D file servers), managing data running at the file system level (e.g., HDFS) or storing structured data (e.g., Bigtable). In some cases, a first storage system may call into a second storage system. For example, a distributed file system may be backed by file servers. The handling service may include computer-readable instructions stored in computer-readable memory that provide for handling of data items in the computing system.

The data characteristic prediction model can be configured to receive, as input, a trace log, such as a trace log including one or more distributed trace item(s) associated with a data item. In some implementations, the distributed trace item(s) and/or the trace log can be represented as a distributed trace string, such as a sequence of delineated and/or nondelineated characters. For instance, in some implementations, the data characteristic prediction model can receive each character separately. As another example, the distributed trace item(s) can be or can include key and value pairs, such as key and value pairs delineated from a distributed trace string into key and value pairs by a distributed trace extraction model. As another example, the trace log can be or can include a sorted (e.g., alphanumerically sorted) and/or unsorted list of distributed trace items. In some implementations, the distributed trace item(s) may be extracted from the trace log (e.g., from a distributed trace string), sorted (e.g., alphanumerically by key) and/or otherwise preprocessed prior to being provided to the data characteristic prediction model.

The distributed trace string and/or distributed trace item(s) can be produced for a particular data item by a distributed tracing system in accordance with a distributed tracing protocol. For example, the distributed tracing system can chronicle a compute path associated with the data item. For example, the compute path can be represented by one or more key and value pair(s) from each service that interacts with the data item.

The data characteristic prediction model can be configured to provide to the computing system, in response to receiving the trace log (e.g., the distributed trace item(s) and/or a distributed trace string) as input one or more data characteristic predictions. In some embodiments, the data characteristic prediction can be a single value. Additionally and/or alternatively, in some embodiments, the data characteristic prediction can include a distribution (e.g., a probabilistic distribution) of a plurality of values. Including a distribution as output of the data characteristic prediction can be beneficial for improved understanding of behavior of the computing system. For instance, for many services, a single predicted value may not be correct in all cases or even a majority of cases, due to variation due to system complexity, network delays, service-level behaviors, and other consideration. The data characteristic predictions can include a distribution for each prediction task, which may be consumed directly by a storage system (e.g., a handling decision model) to make informed handling decisions. For example, in some implementations, the data characteristic prediction model can be configured to receive a collection (e.g., an unordered collection) of distributed trace item(s) and produce, in response to receiving the collection of distributed trace item(s), parameters of a distribution, such as a lognormal distribution (e.g., a mean $\mu$ and/or standard deviation $\sigma$) of a data characteristic prediction.

In some implementations, such as implementations including distributions as data characteristic predictions, data within a trace log may be pre-aggregated. For instance, as one example, pre-aggregation can be performed by taking all distributed trace items in a trace log and computing the distributions for each of the data characteristic prediction distributions (e.g., for a plurality of tasks) that are to be predicted (e.g., interarrival times, lifetimes, etc.). For example, a histogram of these distributions can be collected for each trace log. These histograms may be provided as input to the data prediction model (e.g., representing the trace log). For example, the histograms can be represented by input distributions, such as lognormal input distributions.

In some implementations, the data characteristic prediction model can be or can include a lookup table. For example, in some implementations, the lookup table can include embedding representations of distributed trace items from a training set. A distributed trace item and/or collection of distributed trace items (e.g., a sorted, such as alphanumerically sorted, collection of distributed trace items) can be provided to the lookup table, and, if a match of the input distributed trace item(s) is found in the lookup table, data characteristic(s) corresponding to the matching distributed trace item(s) from the training set can be provided as output of the lookup table. In some implementations, if a match is not found in the lookup table, an overall training set output (e.g., an overall distribution of the training data) may be provided as output of the lookup table. Additionally and/or alternatively, in some implementations, if a match is not found in the lookup table, the distributed trace item(s) may be provided to another model of the data characteristic prediction model, such as a model including a k-nearest neighbor search and/or an encoder submodel. Thus, the lookup table can serve to provide outputs for a subset of possible combinations of distributed trace item(s), such as a subset having high repeatability, low variability, frequent identical requests, etc., and may be supplemented by a fallback model (e.g., a k-nearest neighbor model and/or encoder submodel architecture) for cases that do not exist in the lookup table.

The lookup table can be trained by aggregating data from a plurality of training distributed trace items. For instance, such as in implementations where the data characteristic are or include distributions, the lookup table can be trained by collecting target distribution histograms from a training set, pre-aggregating the histograms, and computing the mean and standard deviation of a lognormal distribution that fits the data. In some implementations, rarely accessed items in the lookup table may be removed from the lookup table. In some implementations, such as in the event that another model is used in place of the lookup table for a particular collection of distributed trace item(s), the collection of distributed trace item(s) and/or the output of the model (e.g., the data characteristics) may be added to the lookup table.

In some implementations, the data characteristic prediction model can include a vector space model configured to map the distributed trace items to a mapping (e.g., a vector) in a vector space. The vector space can additionally include a plurality of neighbor vectors based at least in part on training distributed trace items, such as distributed trace items from training data, such as a training dataset, prior handling requests, etc. Additionally, the data characteristic prediction model can include a k-nearest neighbor model that is configured to select a nearest neighbor vector of the plurality of neighbor vectors based at least in part on the mapping. The k-nearest neighbor model can be or can include any suitable nearest neighbor model, such as an inverted index k-nearest neighbor model. For instance, the k-nearest neighbor model can utilize an approximate k-NN method in which the distance metric for finding the nearest neighbor is based on a number of different distributed trace item(s) between two trace logs (e.g., as encoded in the vector space). For instance, in some implementations, each trace log can be encoded as a sparse binary vector where each entry denotes whether a particular distributed trace item (e.g., a key and value pair) is present in the trace log. In some implementations, K can be about 50.

In some implementations, this distance metric can be computed as the squared L2 distance between sparse binary vectors corresponding to two or more trace logs. This computation can be performed relatively cheaply, which can beneficially contribute to evaluation speed of the k-nearest neighbor model. The use of L2 distance on sparse vectors (which can reach a dimensionality of millions) can provide for highly optimized nearest neighbor searching for sparse vectors. Computing the L2 distance between binary vectors may result in many neighbors of equal distance. For instance, a trace log that has a different value for only one distributed trace item may get matched against a number of trace logs that have a distance of two. In some implementations, to compute the predictions from the k-NN model, the chosen nearest neighbors can be aggregated. For instance, an output mean may be a weighted average over means of the individual neighbors. A standard deviation may be computed by summing a weighted average over the variance of each neighbor, and/or a weighted squared distance between the individual means and the overall mean. The resulting overall mean and standard deviation statistics can then be output as the prediction (e.g., the data characteristic prediction), such as the mean and standard deviation of a data characteristic prediction distribution.

Compared to a lookup table, the k-nearest neighbor model can have a greater generalization ability, but may be unable to extract information from some high-cardinality trace logs. For example, a trace log may include distributed trace items of the format <query-type>, <timestamp>, where "query type" captures information that is desirable to extract. Since "timestamp" will take on a different value for every request, each entry will result in a different trace log. This can mean that a lookup table will grow very large and each entry only has a single data point associated with it. Instead of a histogram of values, the "distribution" associated with this item is therefore a single point mass. This can present difficulty in generalizing, since some nearest neighbor approaches may not recognize that the different values are identical except for the timestamp.

In some implementations, the data characteristic prediction model can be or can include a distributed trace extraction submodel configured to receive the trace log and extract the one or more distributed trace items from the trace log. For example, the trace log may be a string (e.g., of characters) that includes a plurality of undivided distributed trace items. The distributed trace extraction submodel can convert the string into distributed trace items and/or a representation of the distributed trace items, such as an identifier, a one-hot encoding, etc.

In some implementations, the data characteristic prediction model can be or can include a machine-learned model including neural networks, such as an encoder model. For instance, one example implementation of the present disclosure can include a transformer model (e.g., an encoder submodel of a transformer model) that uses an attention mechanism to consume a sequence of inputs, such character strings making up each distributed trace item, and maps them to an embedding, such as a learned encoding. In some implementations, the machine-learned model(s) are trained against a log-likelihood as a loss function such that the model fits a Gaussian. This approach can be beneficial in cases such as, for example, where high-cardinality distributed trace items (e.g., keys) cause inputs to result in trace logs having only a single point. For instance, in some embodiments, the machine-learned model can be an embedding-based model that feeds coded key and value pairs directly into the model. Additionally and/or alternatively, the machine-learned model can parse raw strings of key and value pairs. The model architecture is similar in both cases and involves learning various embedding representations and learned mappings from a high-dimensional input to a latent representation in a (e.g., lower-dimensional) vector space.

For instance, in some implementations, the data characteristic prediction model can be or can include an embedding submodel configured to receive the one or more distributed trace items and produce, based on the one or more distributed trace items, an embedding table. The embedding table can include one or more embeddings. For example, the embedding submodel can map each distributed trace item to an N-dimensional embedding in an N-dimensional embedding space. The embeddings can be aggregated to produce the embedding table.

Additionally and/or alternatively, the data characteristic prediction model can be or can include a character encoding submodel that includes one or more encoder submodels. In some implementations, weights of each of the encoder submodels can be shared. The character encoding submodel can be configured to encode each character of a plurality of characters of the one or more distributed trace items as a one-hot encoding and provide the one-hot encodings to the embedding submodel. For example, the distributed trace items can be encoded as a one-hot encoding based on keys, identifiers, etc. and/or individual characters of the distributed trace items can be encoded as a one-hot encoding. For instance, each of the distributed trace items can then be represented as a sequence of one-hot character encodings. For instance, each encoder submodel can learn to parse a particular distributed trace item. A subsequent model (e.g., an encoder submodel) can learn to parse collections of distributed trace items.

Additionally and/or alternatively, the data characteristic prediction model can be or can include an encoder (e.g., Transformer encoder) submodel that is configured to receive the one or more embeddings from the embedding table and produce, based at least in part on the one or more embeddings, a first encoded output. For example, the encoder (e.g., Transformer encoder) submodel can be a multi-head self-attention submodel, such as a transformer submodel (e.g., a transformer encoder submodel). For instance, the encoder can be configured to receive and process a sequential input.

Additionally and/or alternatively, the data characteristic prediction model can be or can include an averaging layer configured to receive the first encoded output and produce, based at least in part on the first encoded output, an averaged output (e.g., an aggregated output). For example, the averaged output may be or include a shared output embedding, such as a task-independent output embedding. For instance, the shared output embedding can be provided to a plurality of characteristic specific submodels (e.g., characteristic specific layers) that each produce a unique type of data characteristic prediction. In the context of neural networks, the average layer may be considered an aggregation layer.

For example, the data characteristic prediction model can include one or more characteristic specific layers configured to receive the averaged output and produce, based at least in part on the averaged output, one or more data characteristic predictions. In some implementations, the characteristic specific layers can be or can include one or more fully connected layers, such as two fully connected layers. In some implementations, the final layer of the characteristic-specific layers (e.g., producing a standard deviation) can use an ELU activation function. In some implementations, the characteristic specific layers can be or can include multi-layer perceptrons (e.g., configured to produce a classification output). Thus, a front end of the data characteristic prediction model (e.g., up to the averaging layer) can be common for each of the data characteristic predictions, and different submodels (e.g., different layers) can be used for each particular type of data characteristic prediction that is desired. Thus, training several different models can be avoided, and training for several different tasks can be performed simultaneously.

The data characteristic prediction model can be trained (e.g., by backpropagation) by or using a loss function. For example, the loss function can be backpropagated through the model(s) to update one or more parameters of the model(s) (e.g., based on a gradient of the loss function). In some implementations, the data characteristic prediction model is trained based at least in part on a loss function that models a likelihood that the data characteristic prediction was obtained from a distribution of training data. For example, the loss function can measure discrepancy between an input distribution (e.g., mean and/or standard deviation of an input distribution) and an output distribution (e.g., mean and/or standard deviation of an output distribution), such as the distribution of a data characteristic prediction. As one example, the loss function can be:

$$\text{loss} = -\log\left(\frac{1}{\sqrt{2\pi}\sigma} \times e^{\frac{-(y-\mu)^2}{2\sigma^2}}\right)$$

where y is a sampled data characteristic prediction from a data characteristic prediction distribution $\mu$ and $\sigma$ and a are a mean and standard deviation, respectively, of the data characteristic prediction distribution.

The computer-implemented method can include, in response to providing the trace log to the data characteristic prediction model, receiving (e.g., by the computing system) one or more data characteristic predictions associated with the data item. In some implementations, the one or more data characteristic predictions can be or can include a distribution of a data characteristic. For example, in some implementations, the distribution can include a mean and/or standard deviation, such as a lognormal distribution having a mean and a standard deviation. In some implementations, the model can be trained against a specific data characteristic prediction from a data characteristic prediction distribution. For instance, the data characteristic prediction distribution can be sampled periodically (e.g., at every training step) to yield a sample y. As one example, the loss function can be:

$$\text{loss} = -\log\left(\frac{1}{\sqrt{2\pi}\sigma} \times e^{\frac{-(y-\mu)^2}{2\sigma^2}}\right)$$

where y is a sampled data characteristic prediction from a data characteristic prediction distribution and $\mu$ and $\sigma$ are a mean and standard deviation, respectively, of the data characteristic prediction distribution.

The computer-implemented method can include selecting (e.g., by the computing system) a handling operation of a plurality of candidate handling operations based at least in part on the one or more data characteristic predictions. For example, in some implementations, selecting the handling operation of the plurality of candidate handling operations based at least in part on the one or more data characteristic predictions can include selecting a storage medium to store the data item from a plurality of candidate storage mediums. For example, a distribution in a data characteristic prediction can be resolved to a single value (e.g., by sampling) and/or passed as-is to a handling decision model (e.g., a rules or heuristic based model and/or a machine-learned model) that selects the handling option based on the distribution and/or a sample of the distribution.

As one example, selecting the handling operation can include deciding whether to evict a data item from a cache. For instance, at each access, the data characteristic prediction model can predict a mean $\mu$ and standard deviation $\sigma$ of the data item associated with the access request. These parameters can be stored in metadata associated with the data item, such as together with the timestamp of the last access to the item. The data item can have a utility represented as the probability that the next access to the item is within the next Δt seconds. For instance, the utility can be computed as:

$$\text{Utility}(t, \mu, \sigma) = \frac{CDF(t + \Delta t \mid \mu, \sigma) - CDF(t \mid \mu, \sigma)}{1 - (CDF(t \mid \mu, \sigma)}$$

Each item in the cache can be arranged into a priority queue sorted by increasing utility. When an item is inserted into the cache, its utility can be computed and incorporated into the priority queue. When it is necessary to evict an item, the entry at the front of the queue (e.g., after comparing it to the utility of the new item) can be picked for eviction, to ensure that the lowest utility item is evicted.

In some implementations, the data characteristic prediction model can be trained in an online training approach where the model is trained for a general purpose at a first computing system (e.g., a training computing system), then distributed to a second computing system on which the model is configured to operate at runtime (e.g., a data center). Once the model is distributed to the second computing system, the model can be trained (e.g., by the second computing system) by incremental updates on recent data (e.g., prior handling requests) to fine-tune the model for the workload at the second computing system.

Aspects of the present disclosure can provide for a number of technical effects and benefits. For instance, aspects of the present disclosure can operate on trace logs including distributed trace item(s) that are obtained as part of a handling request and sourced from a distributed tracing system. Systems and methods according to example aspects of the present disclosure can thus leverage data which conventionally exists in data centers, which can contribute to achieving improved data handling performance (e.g., storage system performance) without requiring costly and/or complex systems for explicitly transmitting data to a handling service. Additionally and/or alternatively, the systems and methods can achieve improved robustness to changes in service behavior, as the data characteristic prediction model can provide reliable performance even in the absence of explicit matches. Additionally, the data characteristic performance model can provide predictions for multiple prediction tasks (e.g., multiple data characteristic predictions) without requiring multiple models.

Example aspects of the present disclosure can provide for improvements to computing technology. For instance, systems and methods can provide for obtaining, by a computing system including one or more computing devices, a handling request associated with a data item, the handling request instructing the computing system to perform a handling operation with the data item, obtaining, by the computing system, a trace log including one or more distributed trace items, the one or more distributed trace items including data from each of one or more services interacting with the data item, providing, by the computing system, the trace log to a data characteristic prediction model including one or more machine-learned models, in response to providing the trace log to the data characteristic prediction model, receiving, by the computing system, one or more data characteristic predictions associated with the data item, and selecting, by the computing system, a handling operation of a plurality of candidate handling operations based at least in part on the one or more data characteristic predictions. This can provide for a computing system to select from a plurality of candidate handling operations to provide for, for example, more efficient utilization of a variety of data storage types, more efficient utilization of computing resources associated with accessing data in memory, more efficient caching performance, reduced computing times associated with a process, such as reduced computing times attributable to data loading times, reduced utilization of memory resources, such as reduced utilization of memory resources attributable to files that are expired, and/or a variety of other improvements.

With reference now to the Figures, example embodiments of the present disclosure will be discussed in further detail.

FIG. 1 depicts a block diagram of an example computing system 100 that performs data characteristic predicting according to example embodiments of the present disclosure. The system 100 includes a client computing device 102, a server computing system 130, and a training computing system 150 that are communicatively coupled over a network 180.

The client computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The client computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable handling mediums, such as RAM, ROM, EEPROM, EPROM, flash memory devices, magnetic disks, etc., and combinations thereof. The memory 114 can store data 116 and instructions 118 which are executed by the processor 112 to cause the client computing device 102 to perform operations.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable handling mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

The server computing system 130 can store or otherwise include one or more machine-learned data characteristic prediction models 140. For example, the models 140 can be or can otherwise include various machine-learned models. For example, the data characteristic prediction models 140 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example data characteristic prediction models 140 are discussed with reference to FIGS. 4 through 10.

In some implementations, the one or more data characteristic prediction models 140 can be received from the server computing system 130 over network 180 and then used or otherwise implemented by the one or more processors 132. In some implementations, the server computing system 130 can implement multiple parallel instances of a single data characteristic prediction model 140 (e.g., to perform parallel data characteristic predicting across multiple instances of handling services).

More particularly, the data characteristic prediction model 140 can be configured to receive, as input, a trace log, such as a trace log including one or more distributed trace item(s) associated with a data item. The data characteristic prediction model 140 can be configured to provide to the server computing system 130, in response to receiving the trace log (e.g., the distributed trace item(s) and/or a distributed trace string) as input one or more data characteristic predictions.

Additionally or alternatively, one or more data characteristic prediction models 140 can be included in or otherwise stored and implemented by the server computing system 130 that communicates with the client computing device 102 according to a client-server relationship. For example, the data characteristic prediction models 140 can be implemented by the server computing system 140 as a portion of a web service (e.g., a handling service). Thus, one or more models 140 can be stored and implemented at the server computing system 130.

The server computing system 130 can train the models 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable handling mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 140 stored at the client computing device 102 and/or the server computing system 130 using various training or learning techniques, such as, for example, backwards propagation of errors. For example, a loss function can be backpropagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the data characteristic prediction models 140 and/or 140 based on a set of training data 162. The training data 162 can include, for example, one or more trace logs associated with prior handling requests. For example, the trace logs can occur prior to the handling request in the server computing system 130 as-is, an earlier version of server computing system 130 running one or more earlier versions of services, and/or a separate computing system from server computing system 130. For example, the training data can include an aggregated distribution of trace logs.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a handling device, loaded into a memory and executed by one or more processors. In other implementations, the model trainer 160 includes one or more sets of computer-executable instructions that are stored in a tangible computer-readable handling medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

In some implementations, the input to the machine-learned model(s) of the present disclosure can be text or natural language data (e.g., as part of the trace log). The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text (e.g., image containing text) or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

Figure 2:
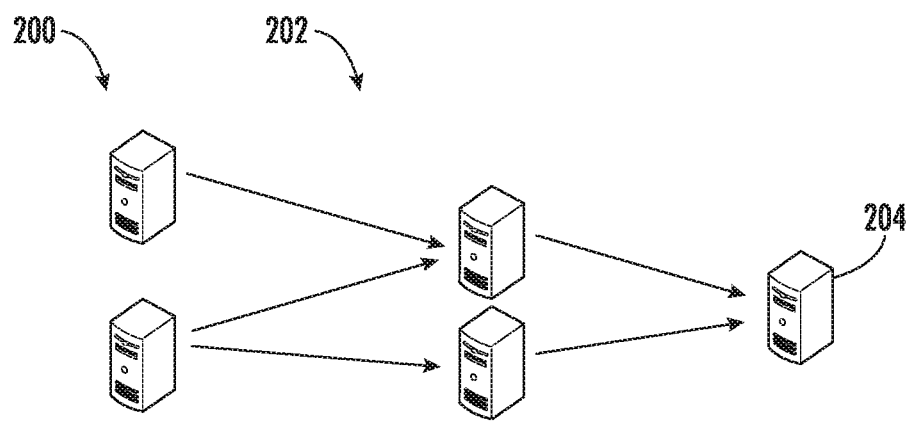
FIG. 2 depicts a block diagram of an example data characteristic predicting system according to example embodiments of the present disclosure.

FIG. 2 depicts a block diagram of an example computing system 200 according to example aspects of the present disclosure. For instance, computing system 200 can include a plurality of computing devices 202 and a storage system 204. Storage system 204 may include a handling service configured to handle data originating from the computing devices 202. The computing system 200 can include a distributed tracing service (e.g., running on some or all of the computing devices 202 and/or storage system 204). For instance, some or all of the computing devices 202 can run distributed tracing services based on distributed tracing frameworks that are designed to attribute resource usage, diagnose bugs in distributed systems, collect traces to be analyzed and replayed at a later point for debugging and/or analysis, etc. For example, some or all services running on computing devices 202 that employ, operate on, or otherwise interact with a data item can append data including one or more distributed trace item(s) (e.g., a key and value pair) to a trace log (e.g., a distributed trace string) associated with the data item, which can accumulate information as the data item is continually processed. As examples, the distributed trace item(s) may be tags that indicate a particular category of request, such as a database operation, numerical information (e.g., an offset), medium and high cardinality labels that can contain unstructured data (e.g., project IDs, table names, etc.), high cardinality labels such as, for example, timestamps or transaction numbers, and/or any other suitable data. Data attached to trace logs by the computing devices 202 (e.g., the distributed trace item(s)) captures a generally large amount of application-level context, such as the services that a data item was utilized by prior to a handling request at storage system 204.

Figure 3:
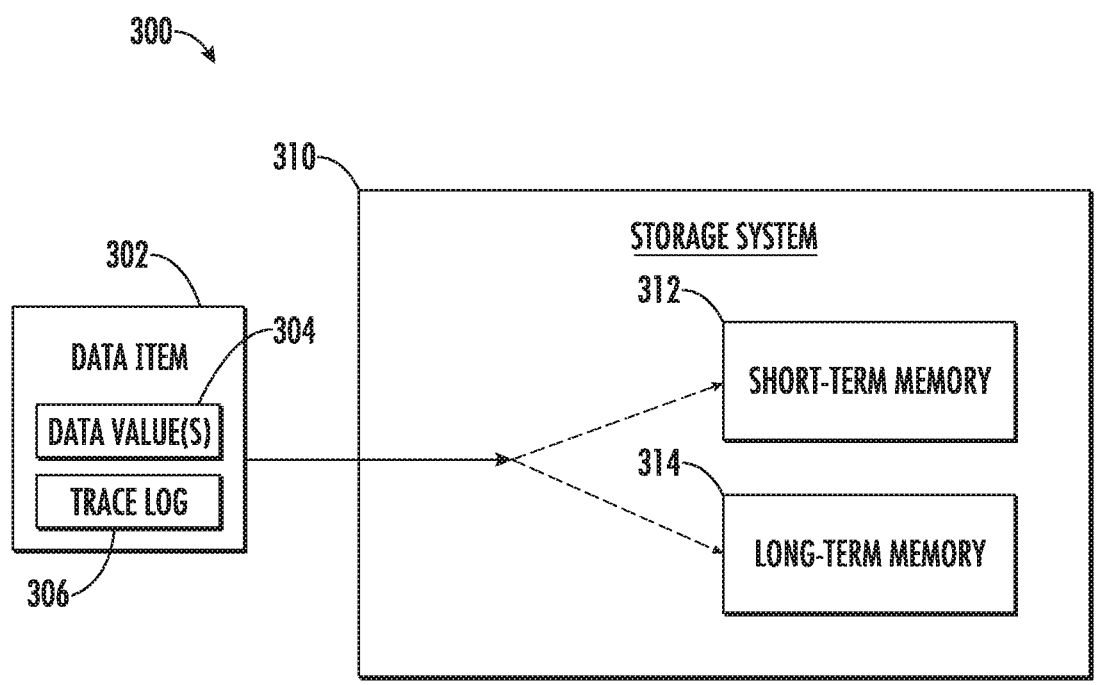
FIG. 3 depicts a block diagram of an example data characteristic predicting system according to example embodiments of the present disclosure.

FIG. 3 depicts a block diagram illustrating a portion of an example computing system 300 according to example aspects of the present disclosure. Computing system 300 can include a storage system 310 that includes short term memory 312 and long term memory 314. Storage system 310 is tasked with a handling option that includes determining whether to store data item 302 in either short term memory 312 or long term memory 314. Data item 302 can include data values 302 (e.g., upon which services may operate) and a trace log 304. According to example aspects of the present disclosure, computing system 300 can employ a data characteristic prediction model to determine which of short term memory 312 or long term memory 314 will best store data item 302.

Figure 4:
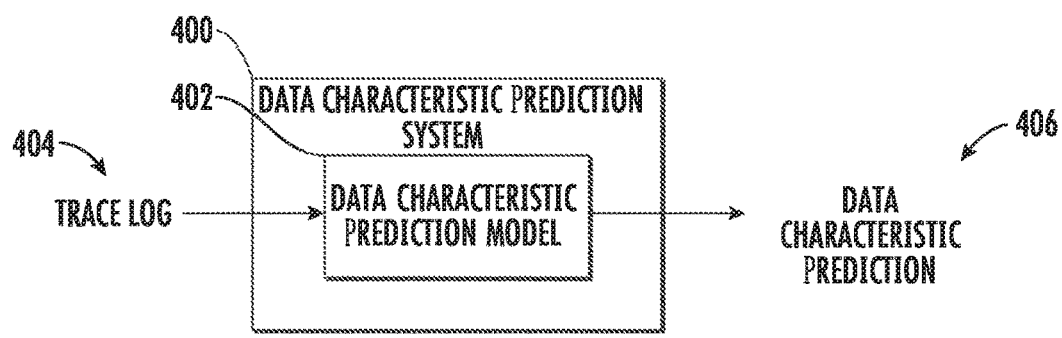
FIG. 4 depicts a block diagram of an example data characteristic predicting system according to example embodiments of the present disclosure.

FIG. 4 depicts a block diagram of an example data characteristic predicting system 400 according to example embodiments of the present disclosure. In some implementations, the data characteristic predicting system 400 is trained to receive a set of input data 404 descriptive of a trace log and, as a result of receipt of the input data 404, provide output data 406 that includes one or more data characteristic predictions. Thus, in some implementations, the data characteristic predicting system 400 can include a data characteristic prediction model 402 that is operable for data characteristic predicting according to example aspects of the present disclosure.

Figure 5:
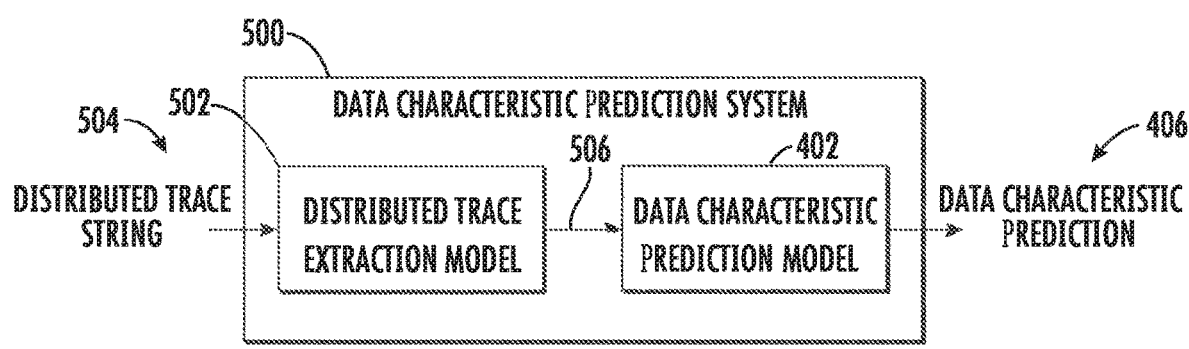
FIG. 5 depicts a block diagram of an example data characteristic predicting system according to example embodiments of the present disclosure.

FIG. 5 depicts a block diagram of an example data characteristic predicting system 500 according to example embodiments of the present disclosure. The data characteristic predicting system 500 is similar to data characteristic predicting system 400 of FIG. 4 except that data characteristic predicting system 500 further includes a distributed trace extraction submodel 502 configured to receive input data 504 that is descriptive of a distributed trace string and extract one or more distributed trace items 506 from the input data 504. For example, the distributed trace string can be a string (e.g., of characters) that includes a plurality of undivided distributed trace items. The distributed trace extraction submodel 502 can convert the string into distributed trace items and/or a representation of the distributed trace items, such as an identifier.

Figure 6:
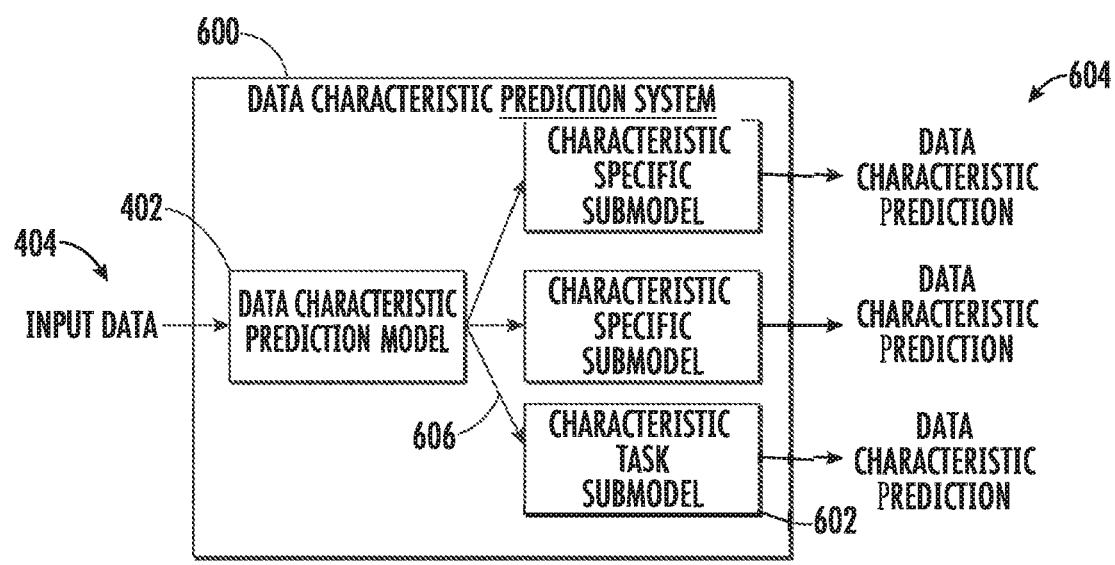
FIG. 6 depicts a block diagram of an example data characteristic prediction model according to example embodiments of the present disclosure.

FIG. 6 depicts a block diagram of an example data characteristic predicting system 600 including a multi-task model according to example embodiments of the present disclosure. The data characteristic predicting system 600 can include a data characteristic prediction model 402 and one or more characteristic specific submodels 602. For instance, the data characteristic prediction model 402 may be configured to produce a shared output embedding 606, such as a task-independent output embedding 606. For instance, the shared output embedding 606 can be provided to a plurality of characteristic specific submodels 602 (e.g., characteristic specific layers) that each produce a unique type of data characteristic prediction 604. In some implementations, the characteristic specific submodels 602 can be or can include one or more fully connected layers, such as two fully connected layers. In some implementations, the final layer of the characteristic-specific submodels 602 (e.g., producing a standard deviation) can use an ELU activation function. In some implementations, the characteristic specific submodels 602 can be or can include multi-layer perceptrons (e.g., configured to produce a classification output). Thus, a front end of the data characteristic predicting system 600 can be common for each of the data characteristic predictions 604, and different submodels 602 (e.g., different layers) can be used for each particular type of data characteristic prediction 604 that is desired. Thus, training several different models can be avoided, and training for several different tasks can be performed simultaneously.

Figure 7:
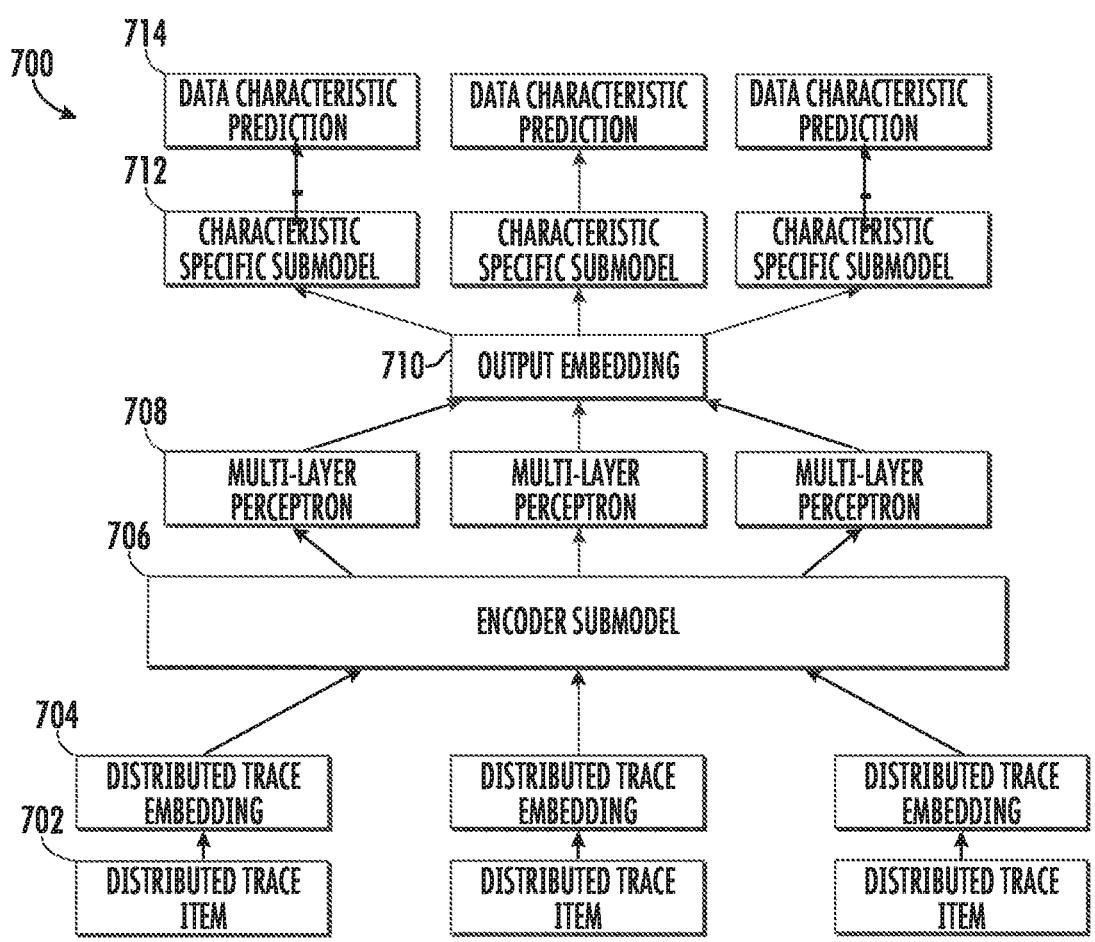
FIG. 7 depicts a block diagram of an example data characteristic prediction model according to example embodiments of the present disclosure.

FIG. 7 depicts a block diagram of an example data characteristic prediction model 700 according to example embodiments of the present disclosure. The data characteristic prediction model 700 can obtain one or more distributed trace item(s) 702. As examples, the distributed trace item(s) 702 may be tags that indicate a particular category of request, such as a database operation, numerical information (e.g., an offset), medium and high cardinality labels that can contain unstructured data (e.g., project IDs, table names, etc.), high cardinality labels such as, for example, timestamps or transaction numbers, and/or any other suitable data.

Data characteristic prediction model 700 can produce one or more distributed trace embedding(s) 704 based at least in part on the distributed trace item(s) 702. For instance, in some implementations, the data characteristic prediction model 700 can be or can include an embedding submodel configured to receive the one or more distributed trace items and produce, based on the one or more distributed trace items, an embedding table including the distributed trace embeddings 704. For example, the embedding submodel can map each distributed trace item 702 to an N-dimensional embedding 704 in an N-dimensional embedding space. The embeddings 704 can be aggregated to produce the embedding table.

The data characteristic prediction model 700 can include an encoder (e.g., Transformer encoder) submodel 706 that is configured to receive the distributed trace embeddings 704 (e.g., from the embedding table) and produce, based at least in part on the embeddings 704, an encoded output. For example, the encoder (e.g., Transformer encoder) submodel can be a multi-head self-attention submodel, such as a transformer submodel (e.g., a transformer encoder submodel). The output of the encoder (e.g., Transformer encoder) submodel can be fed to one or more multi-layer perceptrons 708 and aggregated to produce a shared output embedding 710.

The shared output embedding 710 can be provided to one or more characteristic specific submodels 712 that each produce a unique type of data characteristic prediction 714. In some implementations, the characteristic specific submodels 712 can be or can include one or more fully connected layers, such as two fully connected layers. In some implementations, the final layer of the characteristic-specific submodels 712 (e.g., producing a standard deviation) can use an ELU activation function. In some implementations, the characteristic specific submodels 712 can be or can include multi-layer perceptrons (e.g., configured to produce a classification output). Thus, a front end of the data characteristic predicting system 710 can be common for each of the data characteristic predictions 714, and different submodels 712 (e.g., different layers) can be used for each particular type of data characteristic prediction 714 that is desired. Thus, training several different models can be avoided, and training for several different tasks can be performed simultaneously.

Figure 8:
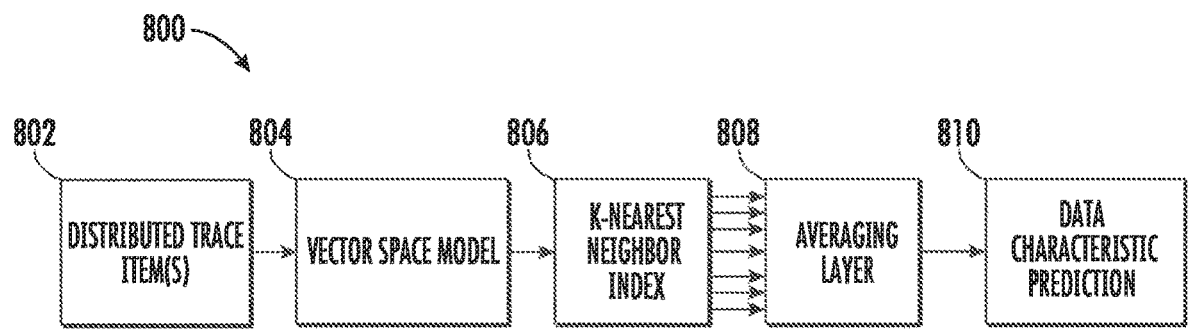
FIG. 8 depicts a block diagram of an example data characteristic prediction model according to example embodiments of the present disclosure.

FIG. 8 depicts a block diagram of an example data characteristic prediction model 800 according to example embodiments of the present disclosure. For instance, data characteristic prediction model 800 can be configured to receive data trace item(s) 802 (e.g., a trace log including one or more data trace items 802). The data characteristic prediction model 800 can include a vector space model 804 that is configured to map the distributed trace items 802 to a mapping (e.g., a vector) in a vector space. The vector space can additionally include a plurality of neighbor vectors based at least in part on training distributed trace items, such as distributed trace items from training data, such as a training dataset, prior handling requests, etc. Additionally, the data characteristic prediction model 800 can include a k-nearest neighbor model 806 that is configured to select a nearest neighbor vector of the plurality of neighbor vectors based at least in part on the mapping. The k-nearest neighbor model 806 can be or can include any suitable nearest neighbor model, such as an inverted index k-nearest neighbor model. For instance, the k-nearest neighbor model 806 can utilize an approximate k-NN method in which the distance metric for finding the nearest neighbor is based on a number of different distributed trace item(s) between two trace logs (e.g., as encoded in the vector space). For instance, in some implementations, each trace log can be encoded as a sparse binary vector where each entry denotes whether a particular distributed trace item (e.g., a key and value pair) is present in the trace log. In some implementations, K can be about 50.

In some implementations, this distance metric can be computed as the squared L2 distance between sparse binary vectors corresponding to two or more trace logs. This computation can be performed relatively cheaply, which can beneficially contribute to evaluation speed of the k-nearest neighbor model. The use of L2 distance on sparse vectors (which can reach a dimensionality of millions) can provide for highly optimized nearest neighbor searching for sparse vectors. Computing the L2 distance between binary vectors may result in many neighbors of equal distance. For instance, a trace log that has a different value for only one distributed trace item may get matched against a number of trace logs that have a distance of two. In some implementations, to compute the predictions from the k-NN model 806, the chosen nearest neighbors can be aggregated. For instance, an output mean may be a weighted average over means of the individual neighbors. A standard deviation may be computed by summing a weighted average over the variance of each neighbor, and/or a weighted squared distance between the individual means and the overall mean. The mean and standard deviation can be computed at averaging layer 808. The resulting overall mean and standard deviation statistics can then be provided as data characteristic prediction 810.

FIG. 9 depicts a block diagram of an example data characteristic prediction model 900 according to example embodiments of the present disclosure. The data characteristic prediction model 900 can obtain one or more distributed trace item(s) 902. As examples, the distributed trace item(s) 902 may be tags that indicate a particular category of request, such as a database operation, numerical information (e.g., an offset), medium and high cardinality labels that can contain unstructured data (e.g., project IDs, table names, etc.), high cardinality labels such as, for example, timestamps or transaction numbers, and/or any other suitable data.

Data characteristic prediction model 900 can produce one or more distributed trace embedding(s) based at least in part on the distributed trace item(s) 902. For instance, in some implementations, the data characteristic prediction model 900 can be or can include an embedding submodel 904 configured to receive the one or more distributed trace items 902 and produce, based on the one or more distributed trace items 902, an embedding table including the distributed trace embeddings. For example, the embedding submodel 904 can map each distributed trace item 902 to an N-dimensional embedding in an N-dimensional embedding space. The embeddings can be aggregated to produce the embedding table.

The data characteristic prediction model 900 can include encoder (e.g., Transformer encoder) model 906 that is configured to receive the distributed trace embeddings (e.g., from the embedding table) and produce, based at least in part on the embeddings, an encoded output. For example, the encoder (e.g., Transformer encoder) model can be a multi-head self-attention model, such as a transformer model (e.g., a transformer encoder model).

Additionally and/or alternatively, the data characteristic prediction model 900 can include averaging layer 908 configured to receive the encoded output and produce, based at least in part on the encoded output, an averaged output. For example, the averaged output may be or include a shared output embedding, such as a task-independent output embedding. For instance, the shared output embedding can be provided to a characteristic specific submodel 910 (e.g., characteristic specific layers) that produces a data characteristic prediction 912. For example, the data characteristic prediction model 900 can include one or more characteristic specific layers 910 configured to receive the averaged output and produce, based at least in part on the averaged output, one or more data characteristic predictions 912. In some implementations, the characteristic specific submodel 910 can be or can include one or more fully connected layers, such as two fully connected layers. In some implementations, the final layer of the characteristic-specific submodel 910 (e.g., producing a standard deviation) can use an ELU activation function. In some implementations, the characteristic specific submodel 910 can be or can include multi-layer perceptrons (e.g., configured to produce a classification output). Thus, a front end of the data characteristic prediction model 900 (e.g., up to the averaging layer 908) can be common for each of the data characteristic predictions 912, and different submodels 910 (e.g., different layers) can be used for each particular type of data characteristic prediction 912 that is desired. Thus, training several different models can be avoided, and training for several different tasks can be performed simultaneously.

FIG. 10 depicts a block diagram of an example data characteristic prediction model 1000 according to example embodiments of the present disclosure. The data characteristic prediction model 1000 can operate on a distributed trace string 1002 that includes one or more distributed trace item(s), such as a character string including the distributed trace item(s). The data characteristic prediction model 1000 can include a character encoding submodel 1004 that includes one or more encoders. In some implementations, weights of each of the encoders can be shared. The character encoding submodel 1004 can be configured to encode each character of a plurality of characters of the one or more distributed trace items as a one-hot encoding.

The data characteristic prediction model 1000 can include an encoder (e.g., Transformer encoder) model 1006 that is configured to receive the distributed trace embeddings (e.g., from the embedding table) and produce, based at least in part on the embeddings, an encoded output. For example, the encoder (e.g., Transformer encoder) model can be a multi-head self-attention model, such as a transformer model (e.g., a transformer encoder model).

For instance, the character encoding submodel 1004 can provide the character embeddings (e.g., one-hot encodings), to the encoder (e.g., Transformer encoder) model 1006. For example, the distributed trace items can be encoded as a one-hot encoding based on keys, identifiers, etc. and/or individual characters of the distributed trace items can be encoded as a one-hot encoding. For instance, each of the distributed trace items can then be represented as a sequence of one-hot character encodings. For instance, each encoder can learn to parse a particular distributed trace item. Thus, the encoder (e.g., Transformer encoder) submodel 906 can learn to parse collections of distributed trace items.

Additionally and/or alternatively, the data characteristic prediction model 1000 can include averaging layer 1008 configured to receive the encoded output and produce, based at least in part on the encoded output, an averaged output. For example, the averaged output may be or include a shared output embedding, such as a task-independent output embedding. For instance, the shared output embedding can be provided to a characteristic specific submodel 1010 (e.g., characteristic specific layers) that produces a data characteristic prediction 1012. For example, the data characteristic prediction model 1000 can include one or more characteristic specific layers 1010 configured to receive the averaged output and produce, based at least in part on the averaged output, one or more data characteristic predictions 1012. In some implementations, the characteristic specific submodel 1010 can be or can include one or more fully connected layers, such as two fully connected layers. In some implementations, the final layer of the characteristic-specific submodel 1010 (e.g., producing a standard deviation) can use an ELU activation function. In some implementations, the characteristic specific submodel 1010 can be or can include multi-layer perceptrons (e.g., configured to produce a classification output). Thus, a front end of the data characteristic prediction model 1000 (e.g., up to the averaging layer 1008) can be common for each of the data characteristic predictions 1012, and different submodels 1010 (e.g., different layers) can be used for each particular type of data characteristic prediction 1012 that is desired. Thus, training several different models can be avoided, and training for several different tasks can be performed simultaneously.

Figure 11:
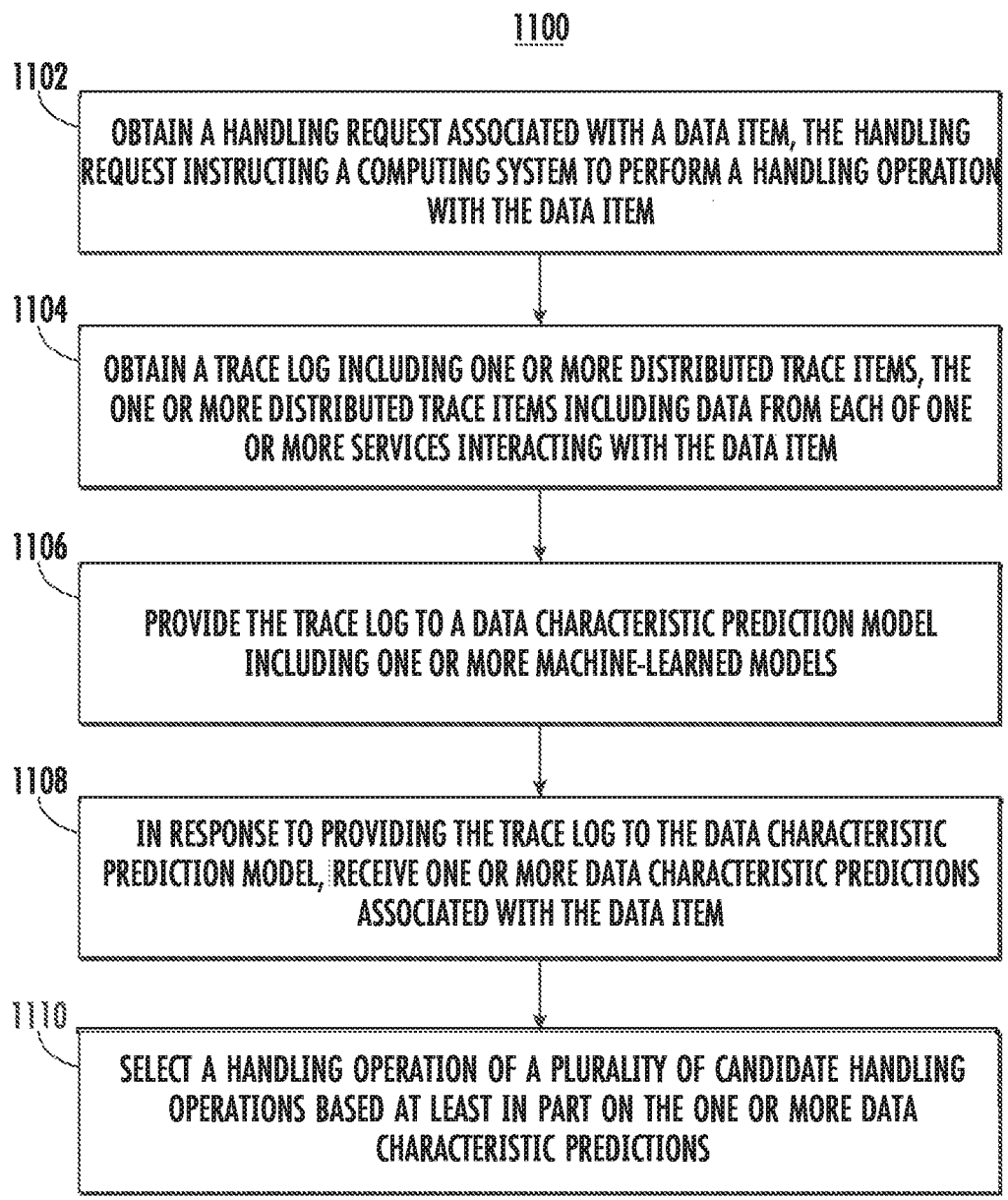
FIG. 11 depicts a flow chart diagram of an example method to perform data characteristic predicting according to example embodiments of the present disclosure.

FIG. 11 depicts a flow chart diagram of an example method to perform data handling in a computing system based on distributed trace information according to example embodiments of the present disclosure. Although FIG. 11 depicts steps performed in a particular order for purposes of illustration and discussion, the methods of the present disclosure are not limited to the particularly illustrated order or arrangement. The various steps of the method 1100 can be omitted, rearranged, combined, and/or adapted in various ways without deviating from the scope of the present disclosure.

According to example aspects of the present disclosure, a computer-implemented method 1100 (e.g., implemented as operations by one or more processors) can provide for managing data in a computing system. For instance, the computer-implemented method 1100 can be stored as instructions in computer-readable memory. The computer-implemented method 1100 can be implemented by a computing system, such as a handling service running on the computing system that handles decisions about data handling.

The computer-implemented method 1100 can include, at 1102, obtaining (e.g., by a computing system including one or more computing devices) a handling request associated with a data item. The handling request can instruct the computing system to perform a handling operation with the data item. For instance, the handling request can instruct the computing system to select and/or execute a handling operation from a plurality of candidate handling operations. The handling operation can be related to handling the data item, such as storing the data item. For example, in some implementations, the handling operation (e.g., each of the candidate handling operations) can be associated with a unique storage medium of a plurality of storage mediums in the computing system. For example, the handling request can be a storage request, requiring that the computing system choose a storage medium in which to store the data item that accounts for future interactions with the data item (e.g., future reads, writes, eviction, etc.). For example, the plurality of storage mediums may include long-term storage, such as magnetic tape, hard disk drives (e.g., spinning disk drives), solid state drives, etc., and/or short-term storage, such as a cache.

The computer-implemented method 1100 can include, at 1104, obtaining, by the computing system, a trace log including one or more distributed trace items. The one or more distributed trace items can include data from each of one or more services that interact with the data item. For example, the trace log can be or can include a distributed trace string including a plurality of characters, where delineated subsets of characters represent each of the distributed trace items. In some implementations, the distributed trace item(s) can be or can include one or more key and value pairs.

The computer-implemented method 1100 can include, at 1106, providing (e.g., by the computing system) the trace log to a data characteristic prediction model. For instance, the data characteristic prediction model can be configured to produce one or more data characteristic predictions in response to receipt of the trace log. The data characteristic prediction model can include one or more machine-learned models (e.g., submodels). For instance, the one or more machine-learned models can be trained on training data that includes one or more distributed trace items from other computing systems and/or prior distributed trace items that are associated with prior handling requests.

For instance, a computing system can include a data characteristic prediction model, such as a machine-learned data characteristic prediction model that includes one or more machine-learned model(s) (e.g., submodel(s)). For instance, the data characteristic prediction model can be stored as computer-readable data on the one or more memory devices. As an example, the data characteristic prediction model can be employed by a handling service configured to handle data (e.g., storage requests) associated with the computing system. The computing system can include a handling service, such as a storage service. A handling service (e.g., storage service) can handle data transfer and/or storage for data item(s) (e.g., file(s), etc.) from the services. For example, the handling service can handle caching (e.g., cache policies, data eviction, etc.), data placement decisions (e.g., storage mediums), garbage collection, predictive prefetching, and/or other suitable handling tasks. The handling service can operate at any of different levels of a storage stack, such as managing physical storage (e.g., storage daemons in file servers, such as Ceph or D file servers), managing data running at the file system level (e.g., HDFS, Colossus) or storing structured data (e.g., Bigtable). In some cases, a first storage system may call into a second storage system. For example, a distributed file system may be backed by file servers. The handling service may include computer-readable instructions stored in computer-readable memory that provide for handling of data items in the computing system.

The data characteristic prediction model can be configured to receive, as input, a trace log, such as a trace log including one or more distributed trace item(s) associated with a data item. In some implementations, the distributed trace item(s) and/or the trace log can be represented as a distributed trace string, such as a sequence of delineated and/or nondelineated characters. For instance, in some implementations, the data characteristic prediction model can receive each character separately (e.g., as a one-hot encoding). As another example, the distributed trace item(s) can be or can include key and value pairs, such as key and value pairs delineated from a distributed trace string into key and value pairs by a distributed trace extraction model, such as a one-hot encoding of key and value pairs. As another example, the trace log can be or can include a sorted (e.g., alphanumerically sorted) and/or unsorted list of distributed trace items. In some implementations, the distributed trace item(s) may be extracted from the trace log (e.g., from a distributed trace string), sorted (e.g., alphanumerically by key) and/or otherwise preprocessed prior to being provided to the data characteristic prediction model.

The distributed trace string and/or distributed trace item(s) can be produced for a particular data item by a distributed tracing system in accordance with a distributed tracing protocol. For example, the distributed tracing system can chronicle a compute path associated with the data item. For example, the compute path can be represented by one or more key and value pair(s) from each service that interacts with the data item.

The data characteristic prediction model can be configured to provide to the computing system, in response to receiving the trace log (e.g., the distributed trace item(s) and/or a distributed trace string) as input one or more data characteristic predictions. In some embodiments, the data characteristic prediction can be a single value. Additionally and/or alternatively, in some embodiments, the data characteristic prediction can include a distribution (e.g., a probabilistic distribution) of a plurality of values. Including a distribution as output of the data characteristic prediction can be beneficial for improved understanding of behavior of the computing system. For instance, for many services, a single predicted value may not be correct in all cases or even a majority of cases, due to variation due to system complexity, network delays, service-level behaviors, and other consideration. The data characteristic predictions can include a distribution for each prediction task, which may be consumed directly by a storage system (e.g., a handling decision model) to make informed handling decisions. For example, in some implementations, the data characteristic prediction model can be configured to receive a collection (e.g., an unordered collection) of distributed trace item(s) and produce, in response to receiving the collection of distributed trace item(s), parameters of a distribution, such as a lognormal distribution (e.g., a mean μ and/or standard deviation σ) of a data characteristic prediction.

In some implementations, such as implementations including distributions as data characteristic predictions, data within a trace log may be pre-aggregated. For instance, as one example, pre-aggregation can be performed by taking all distributed trace items in a trace log and computing the distributions for each of the data characteristic prediction distributions (e.g., for a plurality of tasks) that are to be predicted (e.g., interarrival times, lifetimes, etc.). For example, a histogram of these distributions can be collected for each trace log. These histograms may be provided as input to the data prediction model (e.g., representing the trace log). For example, the histograms can be represented by input distributions, such as lognormal input distributions.

In some implementations, the data characteristic prediction model can be or can include a lookup table. For example, in some implementations, the lookup table can include (e.g., embedding representations of) distributed trace items previously (e.g., prior to inference time) gathered from a training set and an associated output. A distributed trace item and/or collection of distributed trace items (e.g., a sorted, such as alphanumerically sorted, collection of distributed trace items) can be provided to the lookup table, and, if a match of the input distributed trace item(s) is found in the lookup table, data characteristic(s) corresponding to the matching distributed trace item(s) from the training set can be provided as output of the lookup table. In some implementations, if a match is not found in the lookup table, an overall training set output (e.g., an overall distribution of the training data) may be provided as output of the lookup table. Additionally and/or alternatively, in some implementations, if a match is not found in the lookup table, the distributed trace item(s) may be provided to another model of the data characteristic prediction model, such as a model including a k-nearest neighbor search and/or an encoder (e.g., Transformer encoder) model. Thus, the lookup table can serve to provide outputs for a subset of possible combinations of distributed trace item(s), such as a subset having high repeatability, low variability, frequent identical requests, etc., and may be supplemented by a fallback model (e.g., a k-nearest neighbor model and/or encoder (e.g., Transformer encoder) model architecture) for cases that do not exist in the lookup table.

The lookup table can be trained by aggregating data from a plurality of training distributed trace items. For instance, such as in implementations where the data characteristic are or include distributions, the lookup table can be trained by collecting target distribution histograms from a training set, pre-aggregating the histograms, and computing the mean and standard deviation of a lognormal distribution that fits the data. In some implementations, rarely accessed items in the lookup table may be removed from the lookup table. In some implementations, such as in the event that another model is used in place of the lookup table for a particular collection of distributed trace item(s), the collection of distributed trace item(s) and/or the output of the model (e.g., the data characteristics) may be added to the lookup table.

In some implementations, the data characteristic prediction model can include a vector space model configured to map the distributed trace items to a mapping (e.g., a vector) in a vector space. The vector space can additionally include a plurality of neighbor vectors based at least in part on training distributed trace items, such as distributed trace items from training data, such as a training dataset, prior handling requests, etc. Additionally, the data characteristic prediction model can include a k-nearest neighbor model that is configured to select a nearest neighbor vector of the plurality of neighbor vectors based at least in part on the mapping. The k-nearest neighbor model can be or can include any suitable nearest neighbor model, such as an inverted index k-nearest neighbor model. For instance, the k-nearest neighbor model can utilize an approximate k-NN method in which the distance metric for finding the nearest neighbor is based on a number of different distributed trace item(s) between two trace logs (e.g., as encoded in the vector space). For instance, in some implementations, each trace log can be encoded as a sparse binary vector where each entry denotes whether a particular distributed trace item (e.g., a key and value pair) is present in the trace log. In some implementations, K can be about 50.

In some implementations, this distance metric can be computed as the squared L2 distance between sparse binary vectors corresponding to two or more trace logs. This computation can be performed relatively cheaply, which can beneficially contribute to evaluation speed of the k-nearest neighbor model. The use of L2 distance on sparse vectors (which can reach a dimensionality of millions) can provide for highly optimized nearest neighbor searching for sparse vectors. Computing the L2 distance between binary vectors may result in many neighbors of equal distance. For instance, a trace log that has a different value for only one distributed trace item may get matched against a number of trace logs that have a distance of two. In some implementations, to compute the predictions from the k-NN model, the chosen nearest neighbors can be aggregated. For instance, an output mean may be a weighted average over means of the individual neighbors. A standard deviation may be computed by a function of variances and/or distances of neighbors. The resulting overall mean and standard deviation statistics can then be output as the prediction (e.g., the data characteristic prediction), such as the mean and standard deviation of a data characteristic prediction distribution.

Compared to a lookup table, the k-nearest neighbor model can have a greater generalization ability, but may be unable to extract information from some high-cardinality trace logs. For example, a trace log may include distributed trace items of the format <query-type>, <timestamp>, where "query type" captures information that is desirable to extract. Since "timestamp" will take on a different value for every request, each entry will result in a different trace log. This can mean that a lookup table will grow very large and each entry only has a single data point associated with it. Instead of a histogram of values, the "distribution" associated with this item is therefore a single point mass. This can present difficulty in generalizing, since some nearest neighbor approaches may not recognize that the different values are identical except for the timestamp.

In some implementations, the data characteristic prediction model can be or can include a distributed trace extraction submodel configured to receive the trace log and extract the one or more distributed trace items from the trace log. For example, the trace log may be a string (e.g., of characters) that includes a plurality of undivided distributed trace items. The distributed trace extraction submodel can convert the string into distributed trace items and/or a representation of the distributed trace items, such as an identifier.

In some implementations, the data characteristic prediction model can be or can include a machine-learned model including neural networks, such as an encoder (e.g., Transformer encoder) model. For instance, one example implementation of the present disclosure can include a transformer model that uses an attention mechanism to consume a sequence of inputs, such character strings making up each distributed trace item, and maps them to an embedding, such as a learned encoding. In some implementations, the machine-learned model(s) are trained against a log-likelihood as a loss function such that the model fits a Gaussian. This approach can be beneficial in cases such as, for example, where high-cardinality distributed trace items (e.g., keys) cause inputs to result in trace logs having only a single point. For instance, in some embodiments, the machine-learned model can be an embedding-based model that feeds coded key and value pairs directly into the model. Additionally and/or alternatively, the machine-learned model can parse raw strings of key and value pairs. The model architecture is similar in both cases and involves learning various embedding representations and learned mappings from a high-dimensional input to a latent representation in a (e.g., lower-dimensional) vector space.

For instance, in some implementations, the data characteristic prediction model can be or can include an embedding submodel configured to receive the one or more distributed trace items and produce, based on the one or more distributed trace items, an embedding table. The embedding table can include one or more embeddings. For example, the embedding submodel can map each distributed trace item to an N-dimensional embedding in an N-dimensional embedding space. The embeddings can be aggregated to produce the embedding table.

Additionally and/or alternatively, the data characteristic prediction model can be or can include a character encoding submodel that includes one or more encoder submodels. In some implementations, weights of each of the encoder submodels can be shared. The character encoding submodel can be configured to encode each character of a plurality of characters of the one or more distributed trace items as a one-hot encoding and provide the one-hot encodings to the embedding submodel. For example, the distributed trace items can be encoded as a one-hot encoding based on keys, identifiers, etc. and/or individual characters of the distributed trace items can be encoded as a one-hot encoding. For instance, each of the distributed trace items can then be represented as a sequence of one-hot character encodings. For instance, each encoder submodel can learn to parse a particular distributed trace item. A subsequent model (e.g., an encoder (e.g., Transformer encoder) submodel, such as another encoder submodel) can learn to parse collections of distributed trace items.

Additionally and/or alternatively, the data characteristic prediction model can be or can include an encoder (e.g., Transformer encoder) submodel that is configured to receive the one or more embeddings from the embedding table and produce, based at least in part on the one or more embeddings, a first encoded output. For example, the encoder (e.g., Transformer encoder) submodel can be a multi-head self-attention submodel, such as a transformer submodel (e.g., a transformer encoder submodel).

Additionally and/or alternatively, the data characteristic prediction model can be or can include an averaging layer configured to receive the first encoded output and produce, based at least in part on the first encoded output, an averaged output. For example, the averaged output may be or include a shared output embedding, such as a task-independent output embedding. For instance, the shared output embedding can be provided to a plurality of characteristic specific submodels (e.g., characteristic specific layers) that each produce a unique type of data characteristic prediction. For example, the data characteristic prediction model can include one or more characteristic specific layers configured to receive the averaged output and produce, based at least in part on the averaged output, one or more data characteristic predictions. In some implementations, the characteristic specific layers can be or can include one or more fully connected layers, such as two fully connected layers. In some implementations, the final layer of the characteristic-specific layers (e.g., producing a standard deviation) can use an ELU activation function. In some implementations, the characteristic specific layers can be or can include multi-layer perceptrons (e.g., configured to produce a classification output). Thus, a front end of the data characteristic prediction model (e.g., up to the averaging layer) can be common for each of the data characteristic predictions, and different submodels (e.g., different layers) can be used for each particular type of data characteristic prediction that is desired. Thus, training several different models can be avoided, and training for several different tasks can be performed simultaneously.

The data characteristic prediction model can be trained (e.g., by backpropagation) by a loss function. For example, the loss function can be backpropagated through the model(s) to update one or more parameters of the model(s) (e.g., based on a gradient of the loss function). In some implementations, the data characteristic prediction model is trained based at least in part on a loss function that models a likelihood that the data characteristic prediction was obtained from a distribution of training data. For example, the loss function can measure discrepancy between an input distribution (e.g., mean and/or standard deviation of an input distribution) and an output distribution (e.g., mean and/or standard deviation of an output distribution), such as the distribution of a data characteristic prediction.

The computer-implemented method 1100 can include, at 1108, in response to providing the trace log to the data characteristic prediction model, receiving (e.g., by the computing system) one or more data characteristic predictions associated with the data item. In some implementations, the one or more data characteristic predictions can be or can include a distribution of a data characteristic. For example, in some implementations, the distribution can include a mean and/or standard deviation, such as a lognormal distribution having a mean and a standard deviation. In some implementations, the model can be trained against a specific data characteristic prediction from a data characteristic prediction distribution. For instance, the data characteristic prediction distribution can be sampled periodically (e.g., at every training step) to yield a sample y.

The computer-implemented method 1100 can include, at 1110 selecting (e.g., by the computing system) a handling operation of a plurality of candidate handling operations based at least in part on the one or more data characteristic predictions. For example, in some implementations, selecting the handling operation of the plurality of candidate handling operations based at least in part on the one or more data characteristic predictions can include selecting a storage medium to store the data item from a plurality of candidate storage mediums. For example, a distribution in a data characteristic prediction can be resolved to a single value (e.g., by sampling) and/or passed as-is to a handling decision model (e.g., a rules or heuristic based model and/or a machine-learned model) that selects the handling option based on the distribution and/or a sample of the distribution.

As one example, selecting the handling operation can include deciding whether to evict a data item from a cache. For instance, at each access, the data characteristic prediction model can predict a mean μ and standard deviation σ of the data item associated with the access request. These parameters can be stored in metadata associated with the data item, such as together with the timestamp of the last access to the item. The data item can have a utility represented as the probability that the next access to the item is within the next Δt seconds. For instance, the utility can be computed as:

$$\text{Utility}(t, \mu, \sigma) = \frac{CDF(t+\Delta t \mid \mu, \sigma) - CDF(t \mid \mu, \sigma)}{1 - (CDF(t \mid \mu, \sigma)}$$

Each item in the cache can be arranged into a priority queue sorted by increasing utility. When an item is inserted into the cache, its utility can be computed and incorporated into the priority queue. When it is necessary to evict an item, the entry at the front of the queue (e.g., after comparing it to the utility of the new item) can be picked for eviction, to ensure that the lowest utility item is evicted.

In some implementations, the data characteristic prediction model can be trained in an online training approach where the model is trained for a general purpose at a first computing system (e.g., a training computing system), then distributed to a second computing system on which the model is configured to operate at runtime (e.g., a data center). Once the model is distributed to the second computing system, the model can be trained (e.g., by the second computing system) by incremental updates on recent data (e.g., prior handling requests) to fine-tune the model for the workload at the second computing system.

As used herein, "about" in conjunction with a stated numerical value is intended to refer to within 20% of the stated numerical value.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for using machine learning to handle data in a computing system with improved efficiency, the method comprising:
    obtaining, by a computing system comprising one or more computing devices, a handling request associated with a data item, the handling request instructing the computing system to perform a handling operation with the data item;
    obtaining, by the computing system, a trace log comprising one or more distributed trace items associated with the data item, the one or more distributed trace items comprising data from each of one or more services interacting with the data item;
    providing, by the computing system, the trace log to a data characteristic prediction model comprising one or more machine-learned models trained on one or more trace logs associated with prior handling requests;
    in response to providing the trace log to the data characteristic prediction model, receiving, by the computing system, one or more data characteristic predictions associated with the data item; and
    selecting, by the computing system, a handling operation of a plurality of candidate handling operations based at least in part on the one or more data characteristic predictions associated with the data item.

2. The computer-implemented method of claim 1, wherein the one or more data characteristic predictions comprise a distribution of a data characteristic.

3. The computer-implemented method of claim 2, wherein the distribution of the data characteristic comprises a lognormal distribution having a mean and a standard deviation.

4. The computer-implemented method of claim 1, wherein the data characteristic prediction model comprises:
    a vector space model configured to map the one or more distributed trace items to a mapping in a vector space, the vector space comprising a plurality of neighbor vectors, the neighbor vectors based at least in part on training distributed trace items; and
    a k-nearest neighbor model configured to select a nearest neighbor vector of the plurality of neighbor vectors based at least in part on the mapping.

5. The computer-implemented method of claim 4, wherein the k-nearest neighbor model comprises an inverted index k-nearest neighbor model.

6. The computer-implemented method of claim 1, wherein the data characteristic prediction model comprises:
    an embedding submodel configured to receive the one or more distributed trace items and produce, based on the one or more distributed trace items, an embedding table comprising one or more embeddings;
    an encoder submodel configured to receive the one or more embeddings from the embedding table and produce, based at least in part on the one or more embeddings, a first encoded output;
    an averaging layer configured to receive the first encoded output and produce, based at least in part on the first encoded output, an averaged output; and
    one or more characteristic specific layers configured to receive the averaged output and produce, based at least in part on the averaged output, the one or more data characteristic predictions.

7. The computer-implemented method of claim 6, wherein the data characteristic prediction model comprises:
    a character encoding submodel comprising one or more encoder submodels, the character encoding submodel configured to encode each character of a plurality of characters of the one or more distributed trace items as a one-hot encoding and provide the one-hot encoding to the embedding submodel.

8. The computer-implemented method of claim 6, wherein the encoder submodel comprises a multi-head self-attention machine-learned model.

9. The computer-implemented method of claim 6, wherein the encoder submodel comprises a transformer encoder submodel.

10. The computer-implemented method of claim 1, wherein the data characteristic prediction model comprises a distributed trace extraction submodel configured to receive the trace log and extract the one or more distributed trace items from the trace log.

11. The computer-implemented method of claim 1, wherein the handling request comprises a storage request.

12. The computer-implemented method of claim 1, wherein the trace log comprises a distributed trace string.

13. The computer-implemented method of claim 1, wherein the one or more distributed trace items comprise one or more key and value pairs.

14. The computer-implemented method of claim 1, wherein the one or more data characteristic predictions comprise a handling decision.

15. The computer-implemented method of claim 1, wherein the one or more data characteristic predictions comprise at least one of an access interarrival time prediction, a file lifetime prediction, a final file size prediction, access frequency prediction, read/write fraction prediction, antagonistic workload prediction, or resource contention prediction.

16. The computer-implemented method of claim 1, wherein selecting the handling operation of the plurality of candidate handling operations based at least in part on the one or more data characteristic predictions comprises selecting a storage medium to store the data item from a plurality of candidate storage mediums.

17. The computer-implemented method of claim 1, wherein the data characteristic prediction model is trained based at least in part on a loss function that models a likelihood that a data characteristic prediction was obtained from a distribution of training data.

18. The computer-implemented method of claim 17, wherein the training data comprises one or more distributed trace items from one or more prior handling requests occurring prior to the handling request.

19. A computing system configured for using machine learning to handle data with improved efficiency, the computing system comprising:
    one or more processors; and
    one or more memory devices, the one or more memory devices storing:
        a data characteristic prediction model comprising one or more machine-learned models; and
        computer-readable instructions that, when implemented, cause the one or more processors to perform operations;
    wherein the operations comprise:
        obtaining a handling request associated with a data item, the handling request instructing the computing system to perform a handling operation with the data item;
        obtaining a trace log comprising one or more distributed trace items associated with the data item, the one or more distributed trace items comprising data from each of one or more services interacting with the data item;
        providing the trace log to a data characteristic prediction model comprising one or more machine-learned models trained on one or more trace logs associated with prior handling requests;
        in response to providing the trace log to the data characteristic prediction model, receiving one or more data characteristic predictions associated with the data item; and
        selecting a handling operation of a plurality of candidate handling operations based at least in part on the one or more data characteristic predictions associated with the data item.

20. The computing system of claim 19, wherein the data characteristic prediction model comprises:
    an embedding submodel configured to receive the one or more distributed trace items and produce, based on the one or more distributed trace items, an embedding table comprising one or more embeddings;
    an encoder submodel configured to receive the one or more embeddings from the embedding table and produce, based at least in part on the one or more embeddings, a first encoded output;
    an averaging layer configured to receive the first encoded output and produce, based at least in part on the first encoded output, an averaged output; and
    one or more characteristic specific layers configured to receive the averaged output and produce, based at least in part on the averaged output, the one or more data characteristic predictions.

* * * * *